(12) United States Patent
Taniguchi et al.

(10) Patent No.: US 6,785,070 B2
(45) Date of Patent: Aug. 31, 2004

(54) MAGNETIC TRANSCRIPTION DEVICE

(75) Inventors: Kouji Taniguchi, Osaka (JP); Kaoru Matsuoka, Osaka (JP); Taizou Hamada, Osaka (JP); Hideyuki Hashi, Osaka (JP); Yasuaki Ban, Osaka (JP); Tatsuaki Ishida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 245 days.

(21) Appl. No.: 10/007,416

(22) Filed: Dec. 3, 2001

(65) Prior Publication Data

US 2002/0080507 A1 Jun. 27, 2002

(30) Foreign Application Priority Data

Dec. 5, 2000 (JP) ........................................ 2000-369588

(51) Int. Cl.⁷ ................................................. G11B 5/86
(52) U.S. Cl. ............................... 360/17; 360/15; 360/16
(58) Field of Search ...................................... 360/16, 17

(56) References Cited

U.S. PATENT DOCUMENTS 5,247,493 A * 9/1993 Kime et al. .................... 360/75

FOREIGN PATENT DOCUMENTS

| EP | 915 456 | 5/1999 |
|---|---|---|
| EP | 1 168 310 | 1/2002 |
| EP | 1 209 668 | 5/2002 |
| JP | 10-40544 | 2/1998 |
| JP | 10-275435 | 10/1998 |
| JP | 11-175973 | 7/1999 |
| JP | 2000-222728 | 8/2000 |
| JP | 2001-28124 A | 1/2001 |
| JP | 2001-014671 | 1/2001 |
| JP | 2001-266342 | 9/2001 |

* cited by examiner

*Primary Examiner*—David Hudspeth
*Assistant Examiner*—Rocio Colon
(74) *Attorney, Agent, or Firm*—Merchant & Gould P.C.

(57) ABSTRACT

A magnetic transcription device for transcribing information signals of a master information carrier in a magnetic recording medium by applying a magnetic field generated by magnetic field generating means to a contact body obtained by contacting the master information carrier having a base on which ferromagnetic bodies corresponding to the information signals are formed with a magnetic recording medium having a ferromagnetic layer, wherein the magnetic recording medium includes driving means for adjusting a distance between the magnetic field generating means and the contact body while rotating the magnetic field generating means relative to the contact body. Accordingly, an external magnetic field can be applied and removed for transcription of the information signals of the master information carrier in the magnetic recording medium while rotating the magnetic field generating means relative to the contact body, so that the deterioration of reproduction signals from the magnetic recording medium can be prevented.

12 Claims, 33 Drawing Sheets

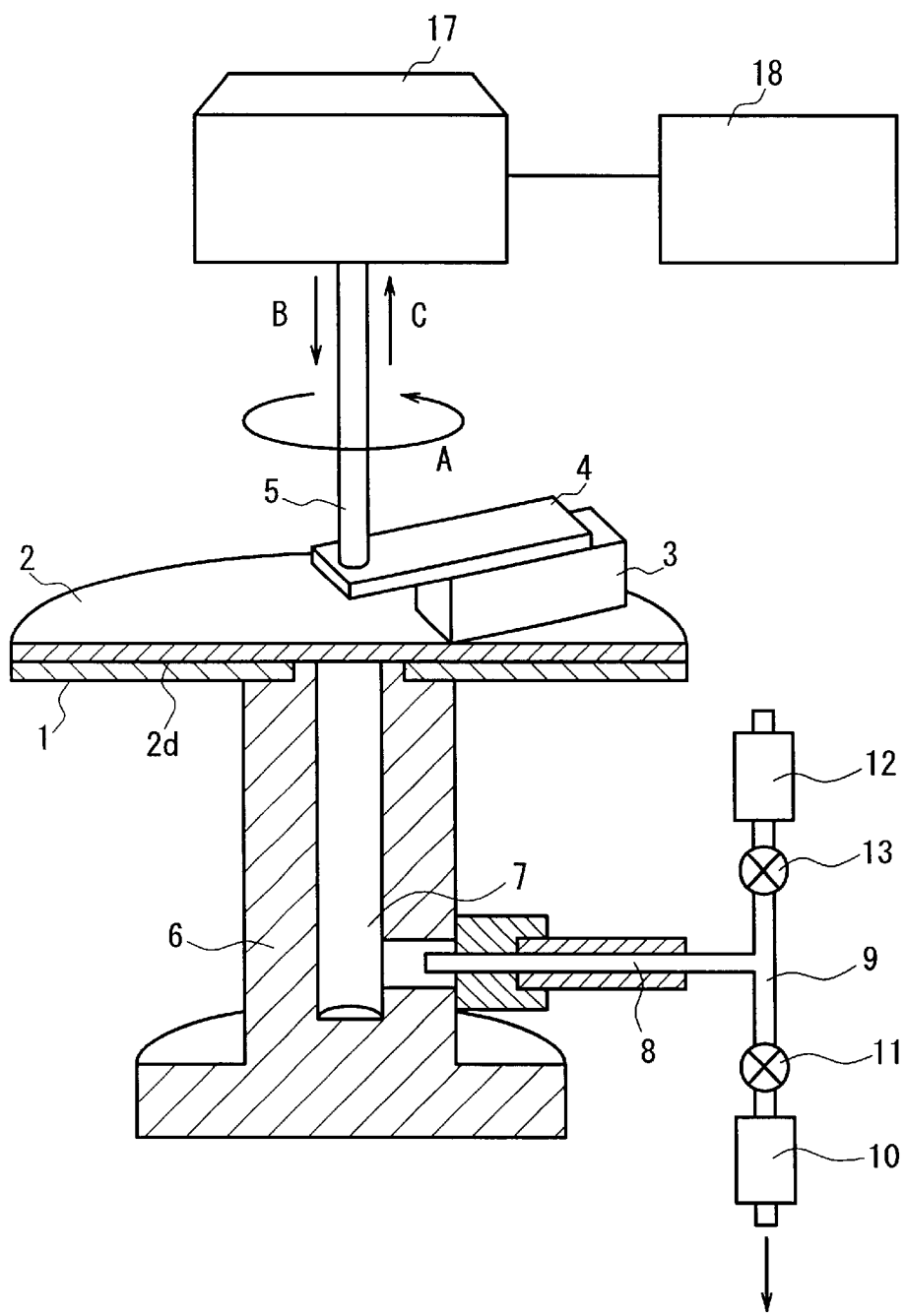
F I G. 1

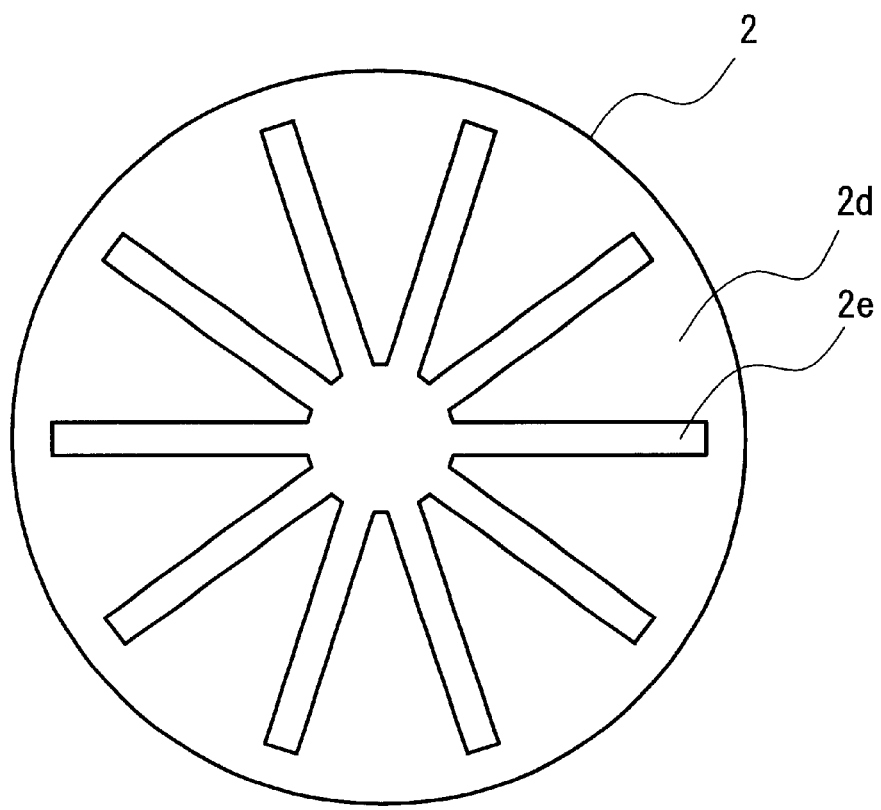
F I G. 2

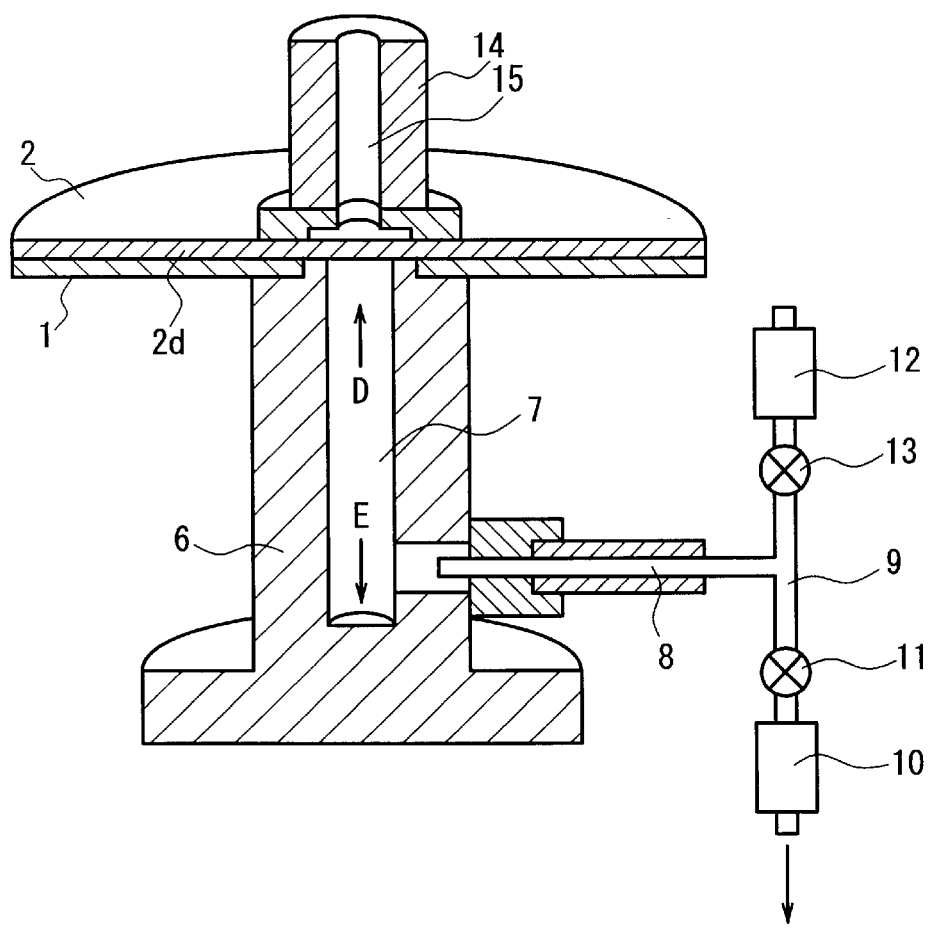
F I G. 3

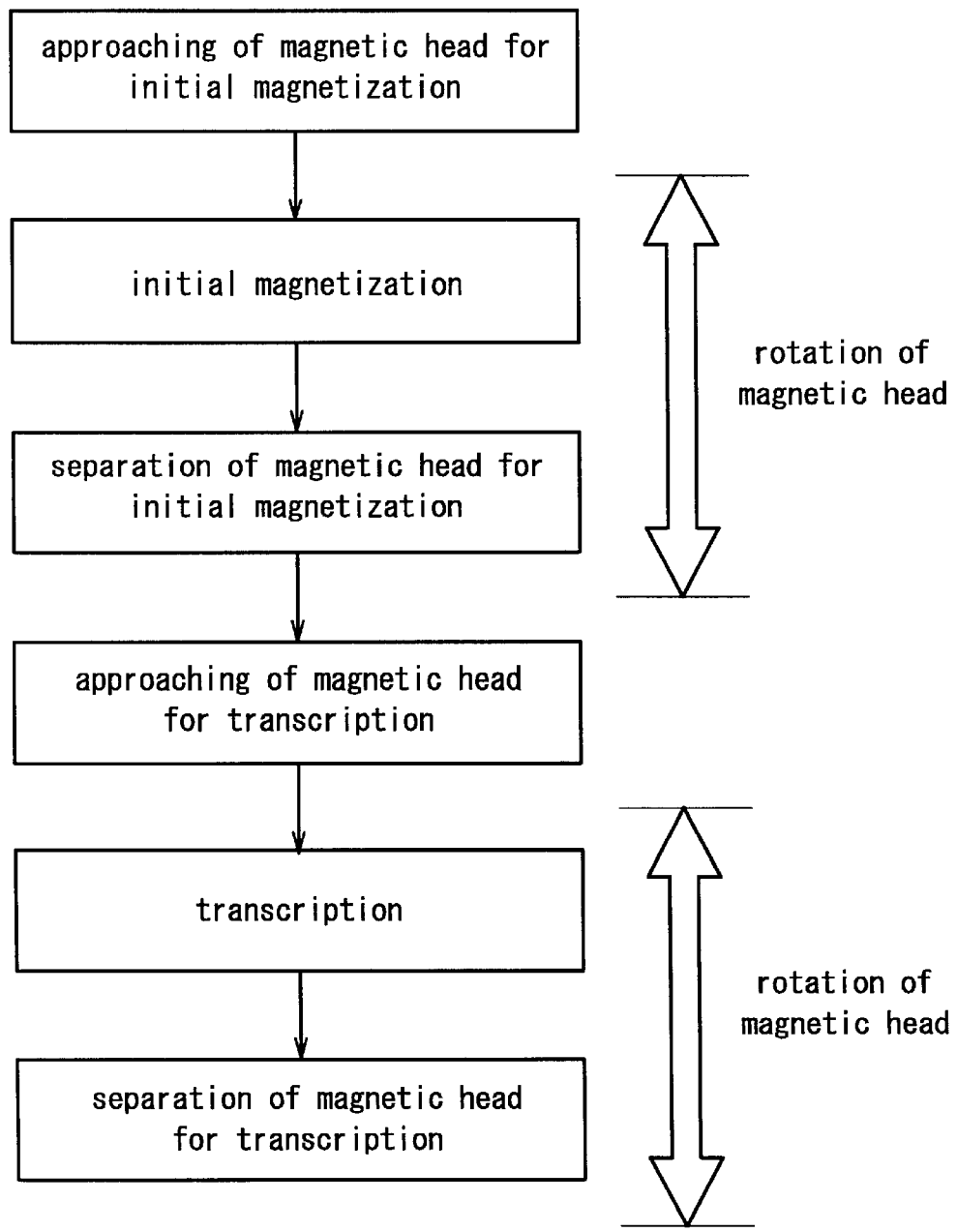
F I G. 5

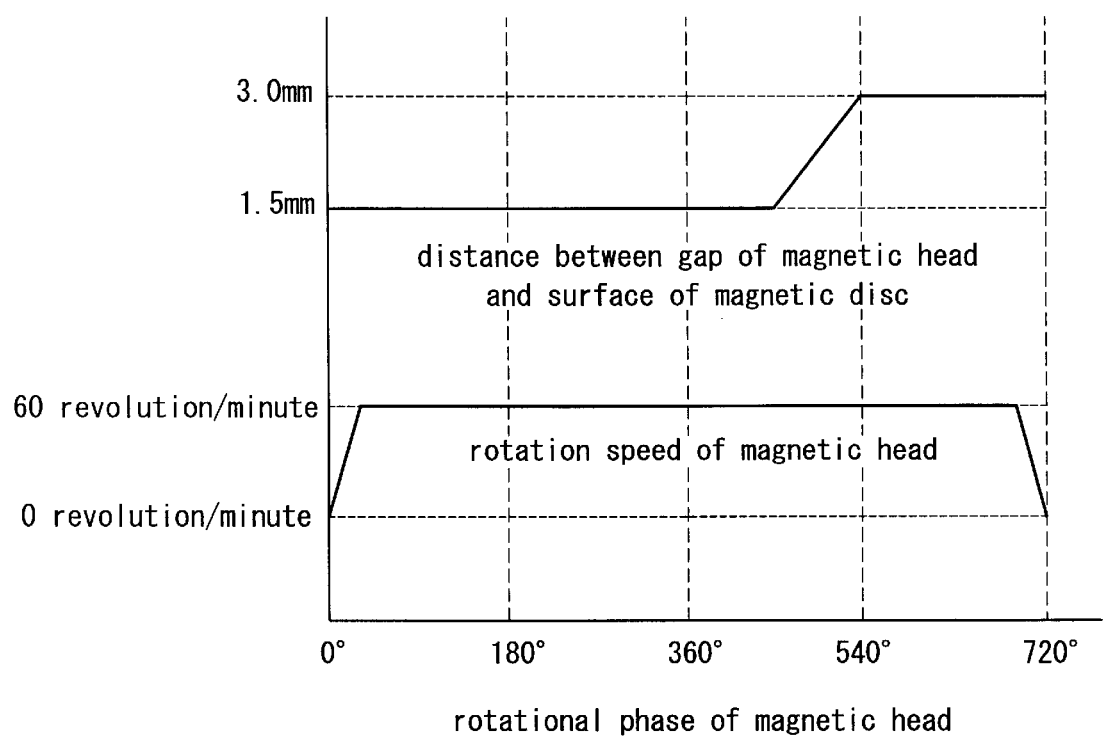
F I G. 7 moving direction of magnetic head

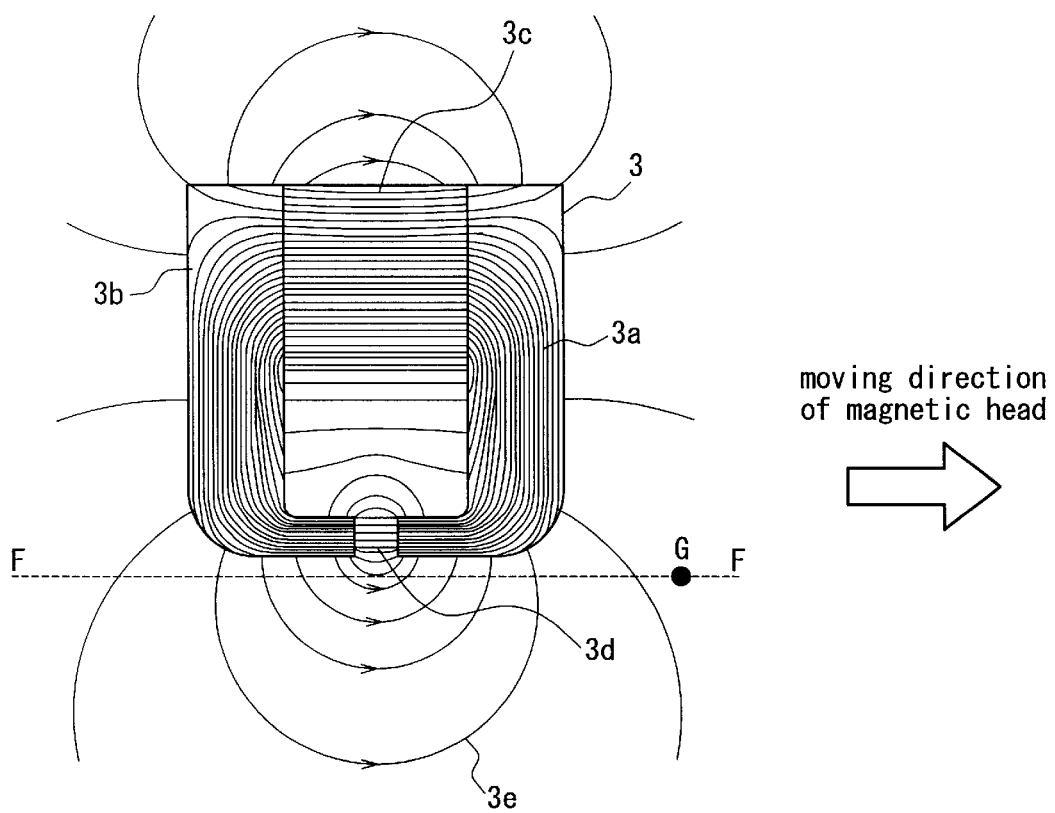
F I G. 15

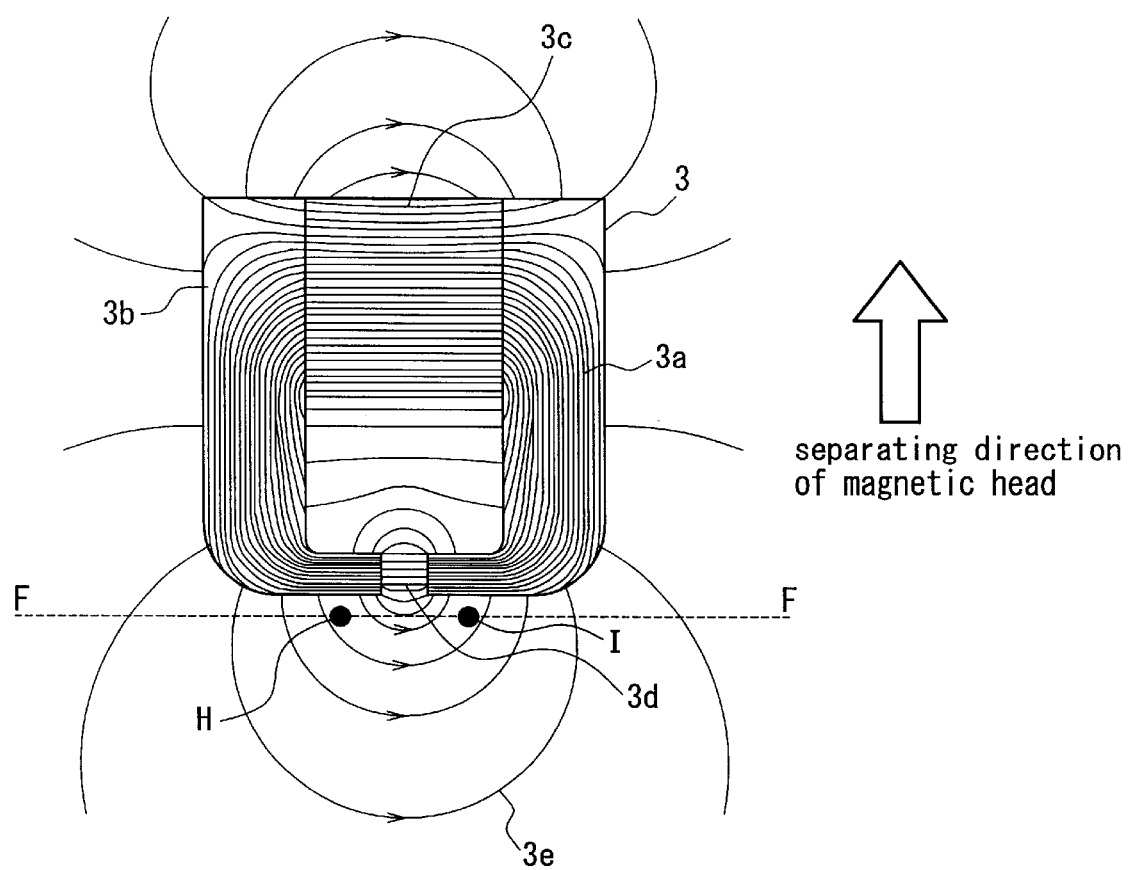
F I G. 1 7

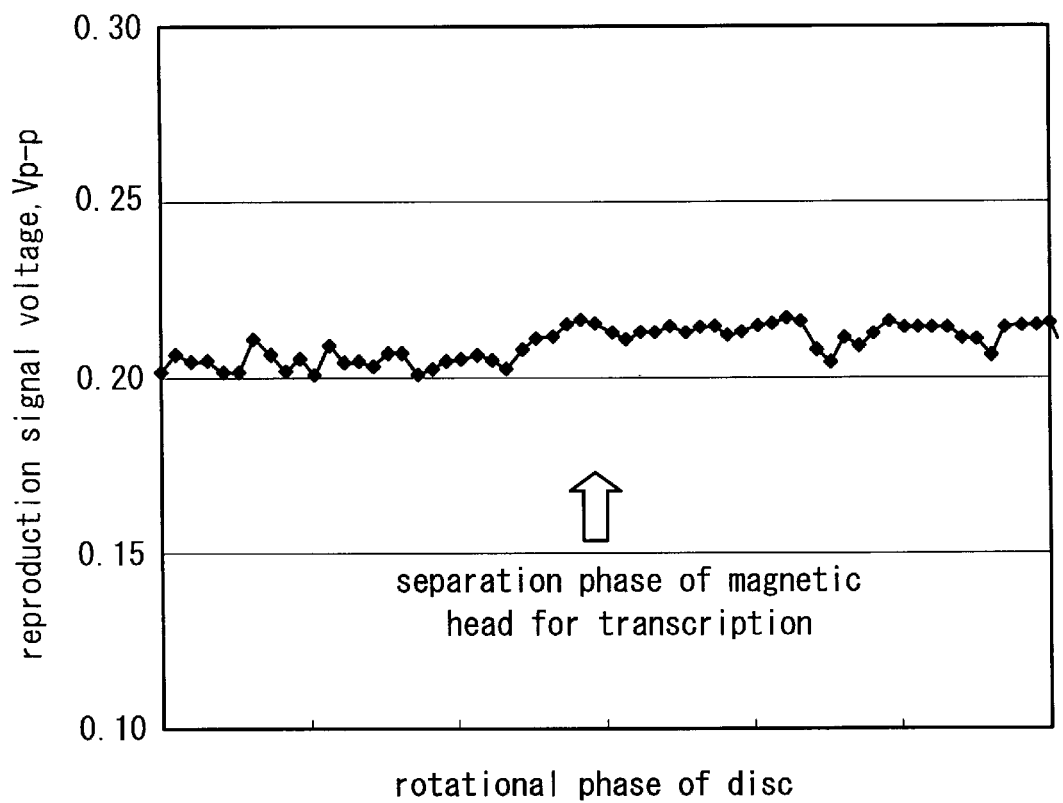
F I G. 2 1

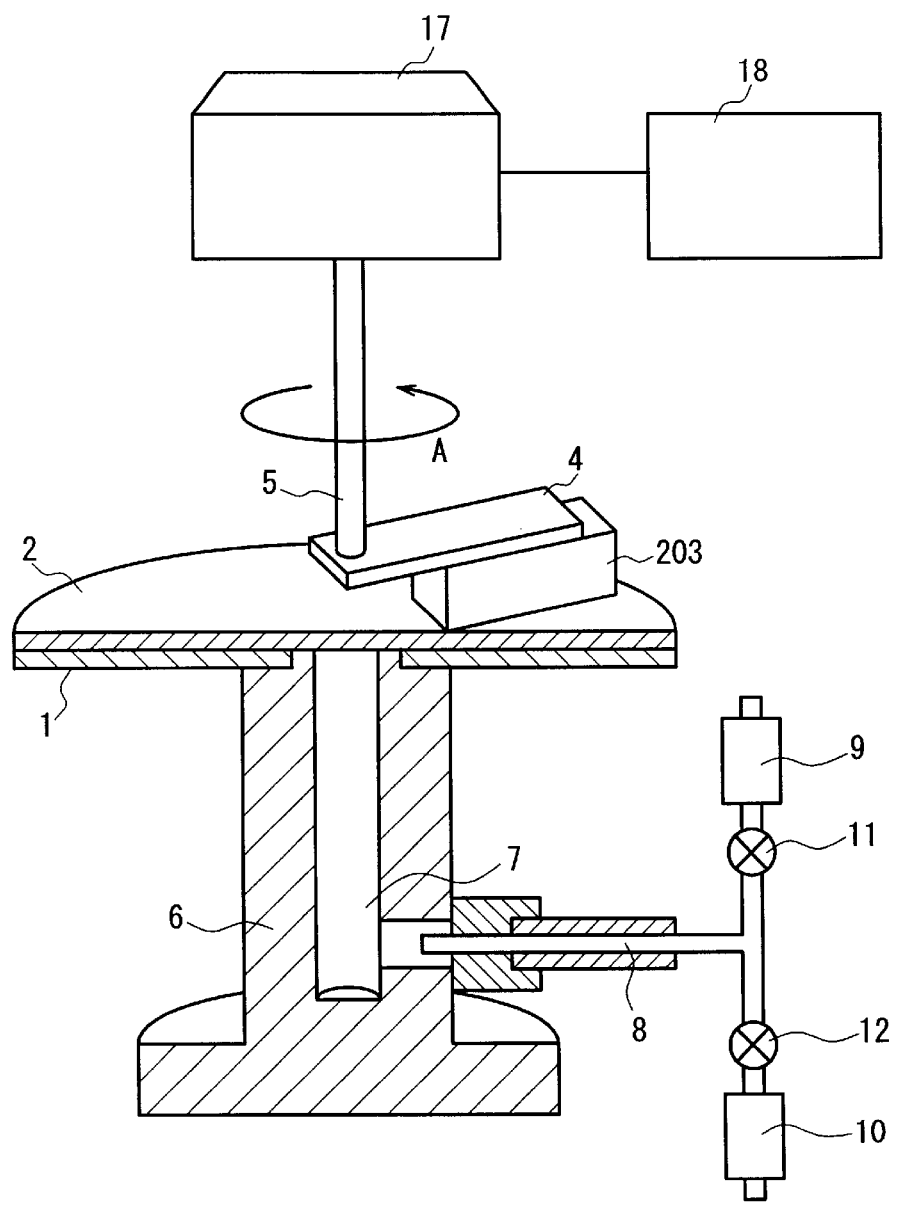
F I G. 25

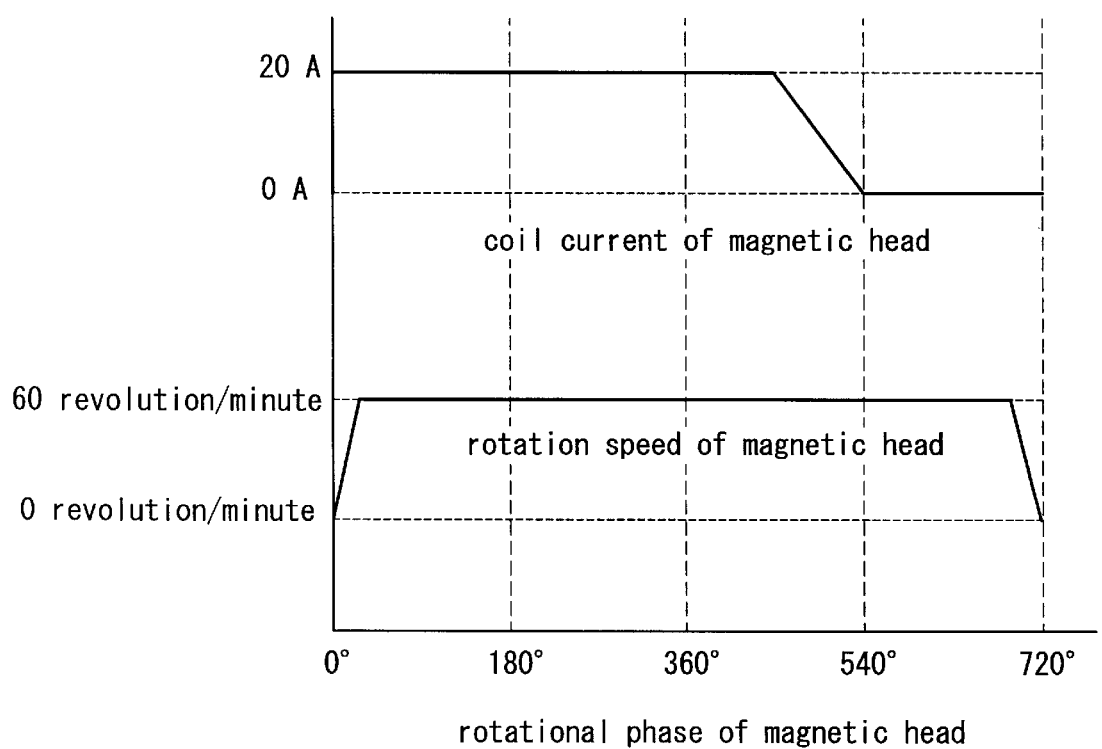
F I G. 2 8

MAGNETIC TRANSCRIPTION DEVICE

BACKGROUND OF THE INVENTION

1. Field of the Invention

The present invention relates to a magnetic transcription device using a master information carrier for recording predetermined information signals in advance on a magnetic recording medium used for a magnetic recording reproduction device having a large capacity and high recording density and also to a method for manufacturing a magnetic recording medium.

2. Description of the Related Art

At present, magnetic recording reproduction devices are being designed to have higher recording density in order to achieve a large capacity with a small size. In the field of a hard disc drive, which is a typical magnetic disc device, a device having an areal recording density of more than 10 Gbits/sqin is commercialized already, and such a rapid progress in the technology can be observed that even the practical use of a device having an areal recording density of 20 Gbits/sqin is predicted to be realized in a year.

As the technical background for enabling such high recording density, significant factors are the improvement in the linear recording density as well as a magneto-resistive element type head that can reproduce a signal with a track width of as small as several μm with excellent S/N characteristics.

Furthermore, along with the development to achieve higher recording density, the demand for a reduction in the amount of floatation for a floating magnetic slider against a magnetic recording medium also is growing, since the possibility of a contact occurring between a disc and a slider is increasing also during floatation. Under such circumstances, the demand for more smoothness for a recording medium is growing.

Now, for a head to scan narrow tracks accurately, the tracking servo technology of the head plays an important role. As for a present hard disc drive employing such tracking servo technology, a servo signal for tracking, an address information signal and a reproduction clock signal etc. are recorded in the magnetic recording medium at a constant angle interval. The drive device identifies and corrects the position of a head by these signals, which are reproduced from the head at a constant time interval, so that the head can scan accurately on the tracks.

Here, as mentioned above, signals such as the servo signal for tracking, the address information signal and the reproduction clock signal serve as reference signals for the head to scan accurately on the tracks. Therefore, the positioning for its writing (hereinafter referred to as a formatting) is required to be performed with high precision. In present hard disc drives, formatting is performed by determining the position of a recording head by using a single-purpose servo device (hereinafter referred to as a servo writer) that uses a high precision position detection device utilizing optical interference.

However, there are the following problems to be solved for performing formatting with the use of the above-mentioned servo writer.

First, a recording by a magnetic head basically is a linear recording based on the relative movement between a magnetic head and a magnetic recording medium. It is necessary to write signals over a large number of tracks, so that the method with the use of a servo writer requires a great amount of time for preformat recording. In addition, since several units of expensive single-purpose servo writers are needed to achieve higher productivity, the cost for preformat recording has become high.

Secondly, an extremely high cost is required for the introduction and maintenance of numerous servo writers. These problems become more serious as the track density is improved and the number of tracks is increased. Therefore, instead of using a servo writer for formatting, a system is proposed in which a so-called master disc on which all the servo information is written in advance is used to perform a surface transcription of the information of the master disc as a whole by overlapping a magnetic disc to be formatted on the master disc and applying an external magnetic field for transcription from the outside.

As one example thereof, a magnetic transcription system is disclosed in JP10(1998)-40544A. According to the system disclosed in this publication, a magnetic portion made of a ferromagnetic material is formed in a pattern corresponding to an information signal on the surface of a base to create a master information carrier, that is, a magnetic transcription master, and the surface of this master information carrier is contacted with the surface of a sheet-type or a disc-type magnetic recording medium on which a ferromagnetic thin film or a ferromagnetic powder-coated layer is formed. Then, by applying a predetermined external magnetic field thereto, a magnetization pattern of the pattern corresponding to the information signal formed on the master information carrier will be recorded on the magnetic recording medium.

An example of the conventional steps performed for initial magnetization and transcription of a magnetic recording medium in such a magnetic transcription system is shown in FIG. 32. Furthermore, FIG. 33 shows the relationship of a distance between a magnetic head gap and the surface of a magnetic recording medium as well as a rotation speed of a magnetic head with respect to the rotational phase of the magnetic head for generating an external magnetic field. The magnetic head is not rotated when the magnetic head approaches to or separates from the magnetic recording medium, and the magnetic head is driven only in the approaching or separating direction. On the other hand, when initial magnetization and transcription are performed, a magnetic field is applied to the magnetic recording medium, so that the magnetic head rotates, centering substantially on the central part of the magnetic recording medium. Therefore, according to the conventional method, the operation of approach and separation of the magnetic head and the rotational operation for initial magnetization and transcription were performed completely independently of each other.

Such a magnetic transcription system involves a method of performing a surface recording of pattern arrays corresponding to information signals formed on a master information carrier as magnetization patterns as a whole, and it is important that the high density information signals are recorded stably over the entire magnetic recording medium.

In the conventional magnetic transcription system as described above, the separation of the magnetic head for transcription is performed with respect to the contact body of the master information carrier and the magnetic recording medium after the magnetic head for transcription is immobilized with respect to the magnetic recording medium, so that there was a problem in that deterioration of a recording signal (a big fluctuation of a reproduction peak level) occurred in a portion corresponding to the separating position of the magnetic head for transcription (the position at the phase of 450 degrees in FIG. 33).

FIG. 34 shows the peak value of a reproduction signal voltage relative to the rotational phase of a magnetic recording medium. The lateral axis in this drawing shows the vicinity of the phase in which the magnetic head is separated, and the values are omitted. This also goes for FIG. 21 to be explained later. FIG. 35 is a waveform of a reproduction signal in a phase in which the magnetic head for transcription is separated. The lateral axis and the vertical axis respectively show the time and the reproduction signal voltage. As indicated by an arrow in FIG. 34, there is a portion where the peak value of the reproduction signal drops. The waveform of the reproduction signal in this portion is shown as FIG. 35. As is clear from FIG. 35, a voltage v2 drops greatly compared to a voltage v1, illustrating that the reproduction signal has deteriorated. Therefore, the ratio of a signal to noise (S/N ratio) drops in this portion, and the rate of errors can be increased.

In the conventional system as described above, a drop in the reproduction signal voltage occurs in the phase in which the magnetic head for transcription is separated. The magnetic transcription recording is performed by an external magnetic field component parallel to the master information carrier. However, in fact, due to the structure of a magnetic head, an external magnetic field component perpendicular to the master information carrier also is applied. The reason why such deterioration of a recording signal as described above arises is that the effect of this vertical component is not cancelled in the phase in which the magnetic head for transcription is separated.

This deterioration of a recording signal in the phase when the magnetic head for transcription is separated tends to increase as the strength of the applied external magnetic field becomes higher. On the other hand, the coercive force of a magnetic recording medium tends to increase along with the further improvement in the recording density, so that the external magnetic field strength to be applied naturally needs to be increased. Therefore, it is considered that the degree of deterioration in the above-mentioned recording signal will become even higher in the future, and the present problem must be solved for a long time to come.

SUMMARY OF THE INVENTION

In view of the foregoing problems, it is an object of the present invention to achieve a magnetic transcription with a high degree of reliability in which signal deterioration does not occur in a position where an external magnetic field is removed.

To achieve the above-mentioned object, a magnetic transcription device of the present invention is a magnetic transcription device for transcribing information signals of a master information carrier in a magnetic recording medium by applying a magnetic field generated by magnetic field generating means to a contact body obtained by contacting the master information carrier with a magnetic recording medium having a ferromagnetic layer, the master information carrier including a base on which ferromagnetic bodies corresponding to the information signals are formed, wherein the magnetic transcription device includes driving means for adjusting a distance between the magnetic field generating means and the contact body while rotating the magnetic field generating means relative to the contact body.

According to the magnetic transcription device as described above, an external magnetic field can be applied and removed for transcription of the information signals of the master information carrier in the magnetic recording medium while rotating the magnetic field generating means relative to the contact body, so that the deterioration of reproduction signals from the magnetic recording medium can be prevented.

In the above-mentioned magnetic transcription device, it is preferable that the driving means is designed to shift the magnetic field generating means and a surface of the contact body close to each other, drive at least one selected from the magnetic field generating means and the contact body to rotate taking substantially the central part of the magnetic recording medium as the center of rotation, and thereby rotate the magnetic field generating means relative to the contact body, and that after the relative rotation is performed at least for one revolution, the magnetic field generating means is separated from the contact body while maintaining the rotational drive. According to the magnetic transcription device as described above, the deterioration of transcription recording signals can be prevented in a phase when the magnetic head is separated, so that uniform transcription recording can be performed over the entire magnetic recording medium.

Furthermore, it is preferable that the magnetic field generating means and the surface of the contact body are shifted close to each other while rotating the magnetic field generating means relative to the contact body such that at least one selected from the magnetic field generating means and the contact body is driven to rotate by taking substantially the central part of the magnetic recording medium as the center of rotation. According to the magnetic transcription device as described above, the deterioration of transcription recording signals can be prevented also when the magnetic head is approaching, so that uniform transcription recording is secured even more over the entire magnetic recording medium.

Furthermore, it is preferable that the driving means can rotate the magnetic field generating means relative to the contact body by driving at least one selected from the magnetic field generating means and the contact body to rotate taking substantially the central part of the magnetic recording medium as the center of rotation in a state in which the magnetic field generating means is in close contact with the contact body, and that the magnetic field generating means has a magnetic core and a coil for generation of a magnetic field through a current supplied to the coil by current application means, and that the current application means is designed to gradually reduce a current value to be supplied to the coil after the relative rotation is performed at least for one revolution in a state in which the rotational drive is maintained. According to the magnetic transcription device as described above, the deterioration of transcription recording signals can be prevented when an external magnetic field is removed by the magnetic head, so that uniform transcription recording can be performed over the entire magnetic recording medium.

Moreover, it is preferable that the current application means applies a current value to the coil for generating a necessary magnetic field for the transcription by gradually increasing the current value while performing the rotational drive. According to the magnetic transcription device as described above, the deterioration of transcription recording signals can be prevented when the magnetic head starts to apply an external magnetic field, so that even more uniform transcription recording is secured over the entire magnetic recording medium.

Furthermore, it is preferable that the magnetic field generating means includes a magnetic core made of a ferromagnetic material and a permanent magnet.

Moreover, it is preferable that the magnetic field generating means includes a magnetic core made of a ferromagnetic material and a coil. According to the magnetic transcription device as described above, an external magnetic field can be applied and removed by controlling an electric current to be supplied to the coil.

Next, a method for manufacturing a magnetic recording medium of the present invention is a method for transcribing information signals of a master information carrier in a magnetic recording medium by applying a magnetic field generated by magnetic field generating means to a contact body obtained by contacting the master information carrier with the magnetic recording medium having a ferromagnetic layer, the master information carrier including a base on which ferromagnetic bodies corresponding to the information signals are formed. The method includes shifting the magnetic field generating means and a surface of the contact body close to each other, driving at least one selected from the magnetic field generating means and the contact body to rotate, rotating the magnetic field generating means relative to the contact body, and after the relative rotation is performed at least for one revolution, separating the magnetic field generating means from the contact body while maintaining the rotational drive to complete the transcription. According to the method for manufacturing a magnetic recording medium as described above, the deterioration of transcription recording signals can be prevented in a phase where the magnetic head is separated, so that uniform transcription recording can be performed over the entire magnetic recording medium.

In the above-mentioned method for manufacturing a magnetic recording medium, it is preferable that the magnetic field generating means the surface of the contact body are shifted close to each other while rotating the magnetic field generating means relative to the contact body such that at least one selected from the magnetic field generating means and the contact body is driven to rotate taking substantially the central part of the magnetic recording medium as the center of rotation. According to the method for manufacturing a magnetic recording medium as described above, the deterioration of transcription recording signals can be prevented also when the magnetic head is approaching, so that even more uniform transcription recording is secured over the entire magnetic recording medium.

Furthermore, it is preferable that the magnetic field generating means has a magnetic core and a coil for generation of a magnetic field through a current supplied to the coil, and that the transcription is completed by gradually reducing a current value to be supplied to the coil after the relative rotation is performed at least for one revolution in a state in which the rotational drive is maintained. According to the magnetic transcription device as described above, the deterioration of transcription recording signals can be prevented when an external magnetic field is removed by the magnetic head, so that uniform transcription recording can be performed over the entire magnetic recording medium.

Moreover, it is preferable that a current value of the coil for generating a necessary magnetic field for the transcription is applied by gradually increasing the current value while performing the rotational drive. According to the magnetic transcription device as described above, deterioration of transcription recording signals can be prevented when the magnetic head starts to apply an external magnetic field, so that even more uniform transcription recording is secured over the entire magnetic recording medium.

BRIEF DESCRIPTION OF THE DRAWINGS

FIG. 1 is a cross-sectional view of a magnetic transcription device at the time of transcription in a first embodiment.

FIG. 2 is a diagram showing a contact surface 3 of a magnetic transcription master 2 with a magnetic disc 1 in the first embodiment.

FIG. 3 is a cross-sectional view showing the state of attracting and separating a master carrier in the magnetic transcription device in the first embodiment.

FIG. 5 is a flowchart showing the steps of transcription in the first embodiment.

FIG. 7 is a graph showing the relationship of a distance between a magnetic head gap and a surface of a magnetic recording medium as well as a rotation speed of a magnetic head with respect to the rotational phase of the magnetic head at the time of transcription in the first embodiment.

FIG. 15 is a cross-sectional view of the magnetic head in the first embodiment.

FIG. 17 is a cross-sectional view of the magnetic head in the first embodiment.

FIG. 21 is a graph showing the relationship between a rotational phase of the disc and a peak value of a reproduction signal in the first embodiment.

FIG. 25 is a cross-sectional view of a magnetic transcription device at the time of transcription in a third embodiment.

FIG. 28 is a graph showing the relationship of a rotational phase of a magnetic head to a rotation speed of the magnetic head and a current value applied to the coil of the magnetic head at the time of transcription in the third embodiment.

DESCRIPTION OF THE PREFERRED EMBODIMENTS

Figure 4:
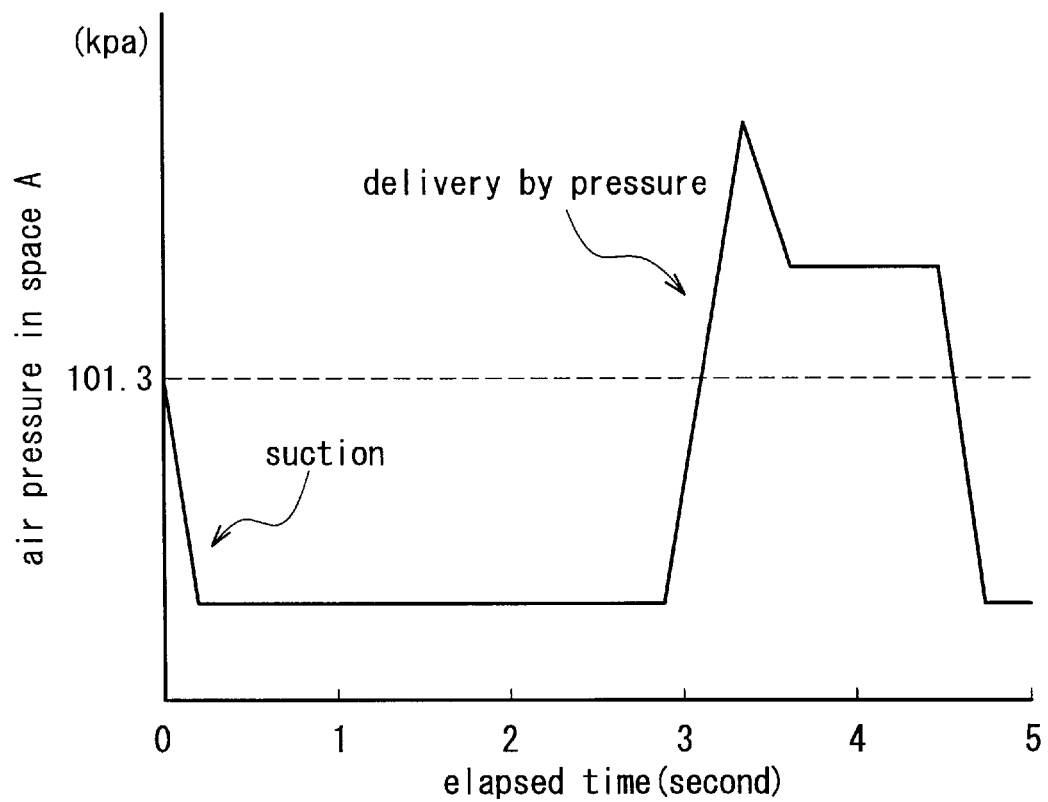
FIG. 4 is a graph showing the relationship between time and air pressure in a space A in the first embodiment.

In the following, embodiments of the present invention will be explained with reference to the drawings.

[First Embodiment]

FIG. 1 shows a magnetic transcription device of the present embodiment. 1 is a magnetic disc serving as a magnetic recording medium, and 2 is a magnetic transcription master serving as a master information carrier. 2d is a contact surface on the magnetic transcription master 2 that is in contact with the magnetic disc 1, and a groove 2e extending radially from the center of the magnetic transcription master 2 is disposed in the contact surface 2d as shown in FIG. 2. 3 is a magnetic head for transcription; 4 is a magnetic head arm; 5 is a magnetic head rotation axis; 17 is a magnetic head driving mechanism; and 18 is a control circuit.

6 is a supporting stand for support of the magnetic disc 1, and a venthole 7 is provided in its central part for a gas flow. 8 is a passage for exhausting and delivering by pressure a gas existing between the magnetic transcription master 2 and the magnetic disc 1. 9 is a gas outlet for exhausting a gas from the pass 8; 10 is a suction pump connected to the gas outlet; and 11 is an exhaust valve for controlling exhausting of gas. Furthermore, 12 is an air-supply pump for delivering a gas by pressure to the passage 8, and 13 is an air-supply valve for controlling a gas supply.

Here, an air filter of 0.01 $\mu$m is provided in the air-supply pump 12, so that foreign bodies of 0.01 $\mu$m or larger cannot be delivered by pressure. First, the driving mechanism of the magnetic head for transcription 3 will be explained. The magnetic head for transcription 3 is attached to the magnetic head driving mechanism 17 via the magnetic head arm 4 and the magnetic head rotation axis 5.

The magnetic head driving mechanism 17 is constructed of a rotation driving part including, for example, a servo motor for rotating the magnetic head for transcription 3 parallel to the magnetic head 1, an elevation mechanism part including, for example, a linear stage for elevating the magnetic head for transcription 3 with respect to the magnetic disc 1, and a withdrawing mechanism part including, for example, a linear stage as mentioned above for withdrawing the magnetic head for transcription 3 from the surface of the magnetic disc 1 (the details are not shown in the drawing).

The magnetic head driving mechanism 17 is connected to the control circuit 18, and flexibly controls the drive according to an instruction signal from the control circuit 18. In addition, the magnetic head driving mechanism is not limited to the configuration mentioned above and may be formed in any other configuration as long as a similar operation can be performed.

Next, the steps for attracting/separating the magnetic transcription master by pressure will be explained in detail with reference to FIG. 1 and FIG. 3. First, the step of separation through delivery of pressure will be explained with reference to FIG. 3.

After the magnetic head 3, the magnetic head arm 4 and the rotation axis 5 shown in FIG. 1 are withdrawn from the upper portion of the magnetic transcription master 2 by the magnetic head driving mechanism 17 based on a signal from the control circuit 18, a master transporting member for magnetic transcription 14 is contacted closely with the magnetic transcription master 2. Thereafter, gas is vented from a vacuum path 15 disposed in the master transporting member for magnetic transcription 14 so that the magnetic transcription master is attached.

Next, the air-supply pump 12 is operated in a state in which the exhaust valve 11 is closed and the air-supply valve 13 is opened, so that gas flows into the passage 8. Then, air is delivered by pressure in the upper direction indicated by an arrow D of FIG. 3 in the venthole 7. Thus, the air delivered by pressure into the venthole 7 is delivered into a groove 2e by pressure. The air delivered into the groove 2e by pressure passes the groove 2e and expands radially from the center of the magnetic transcription master 2 toward its outer periphery.

Then, the air passes further from the groove 2e through a clearance between the magnetic transcription master 2 and the magnetic disc 1 toward the atmosphere. Through this operation, the magnetic transcription master 2 contacted closely with the magnetic disc 1 is separated slightly therefrom.

FIG. 4 is a diagram showing the relationship between an elapsed time at this point and air pressure in the space interposed between the magnetic transcription master 2 and the magnetic disc 1 (hereinafter abbreviated as space A). In this drawing, the air pressure in the space A rises momentarily over 101.3 kpa after about 3 seconds have elapsed, and the air pressure is maintained approximately at 130 kpa during one second to follow, which is a period corresponding to the state in which the magnetic transcription master 2 and the magnetic disc 1 are separated from each other as mentioned above.

Next, the step of achieving a close contact by suction will be explained also with reference to FIG. 3. The air-supply pump 12 is stopped, and the air-supply valve 13 is closed. Thereafter, the exhaust valve 11 is opened, and the suction pump 10 is operated. Through this operation, gas in the venthole 7 is vented in the lower direction as indicated by an arrow E of FIG. 3, so that the gas inside the groove 2e, that is, in the space A also is vented.

Here, as shown in FIG. 2, the groove 2e is not formed as a groove that comes out from the outermost periphery of the magnetic transcription master 2, so that in the doughnut-shaped portion of the outermost periphery, the magnetic transcription master 2 and the magnetic disc 1 are contacted closely with each other over the entire circumference, and the space A is enclosed. The pressure therein becomes lower than the atmospheric pressure.

Therefore, the magnetic transcription master 2 is pressed against the magnetic disc 1 by the atmospheric pressure. A section where the air pressure of the space A is indicated as about 30 kpa in FIG. 4 corresponds to the closely contacted state mentioned above.

Figure 9:
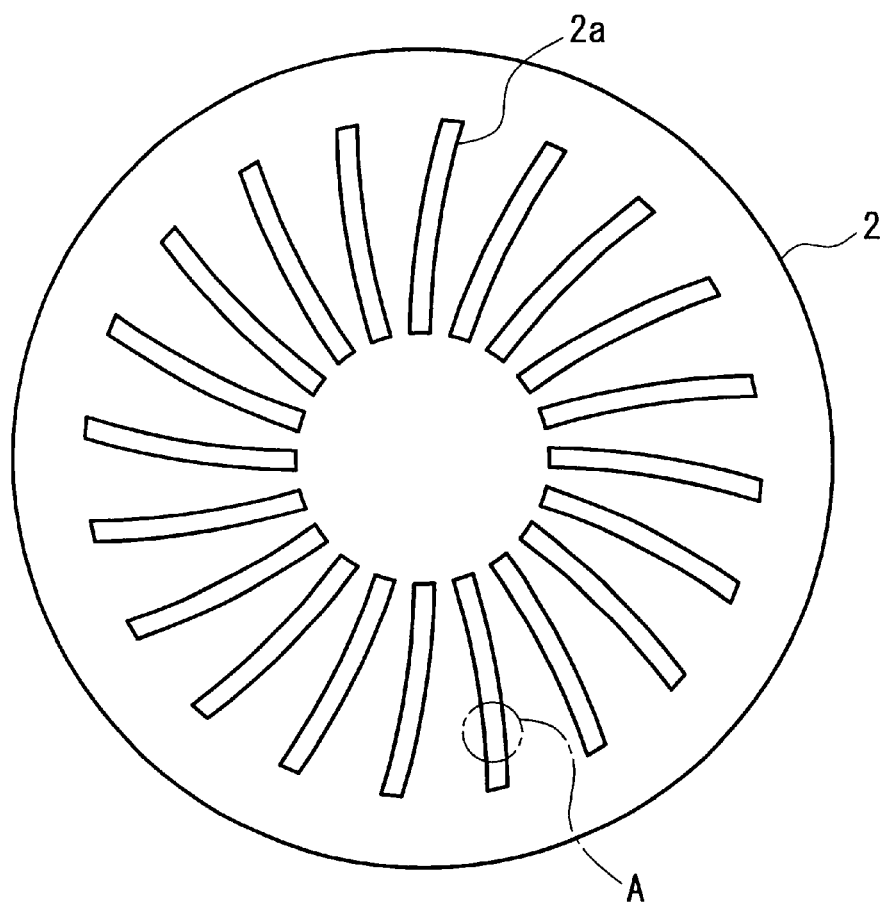
FIG. 9 is a diagram showing the signal area on the master information carrier in the first embodiment.

Next, the magnetic transcription master 2 will be described in detail. FIG. 9 schematically shows a flat surface in one example of the magnetic transcription master 2. As shown in FIG. 9, a signal area 2a is formed substantially radially in one principal plane of the magnetic transcription master 2, that is, in the surface on the side that contacts a ferromagnetic thin film surface of the magnetic disc 1. FIG. 2 and FIG. 9 are schematic diagrams, and in fact, the signal area 2a in FIG. 9 is formed on the contact surface shown in FIG. 2.

Figure 10:
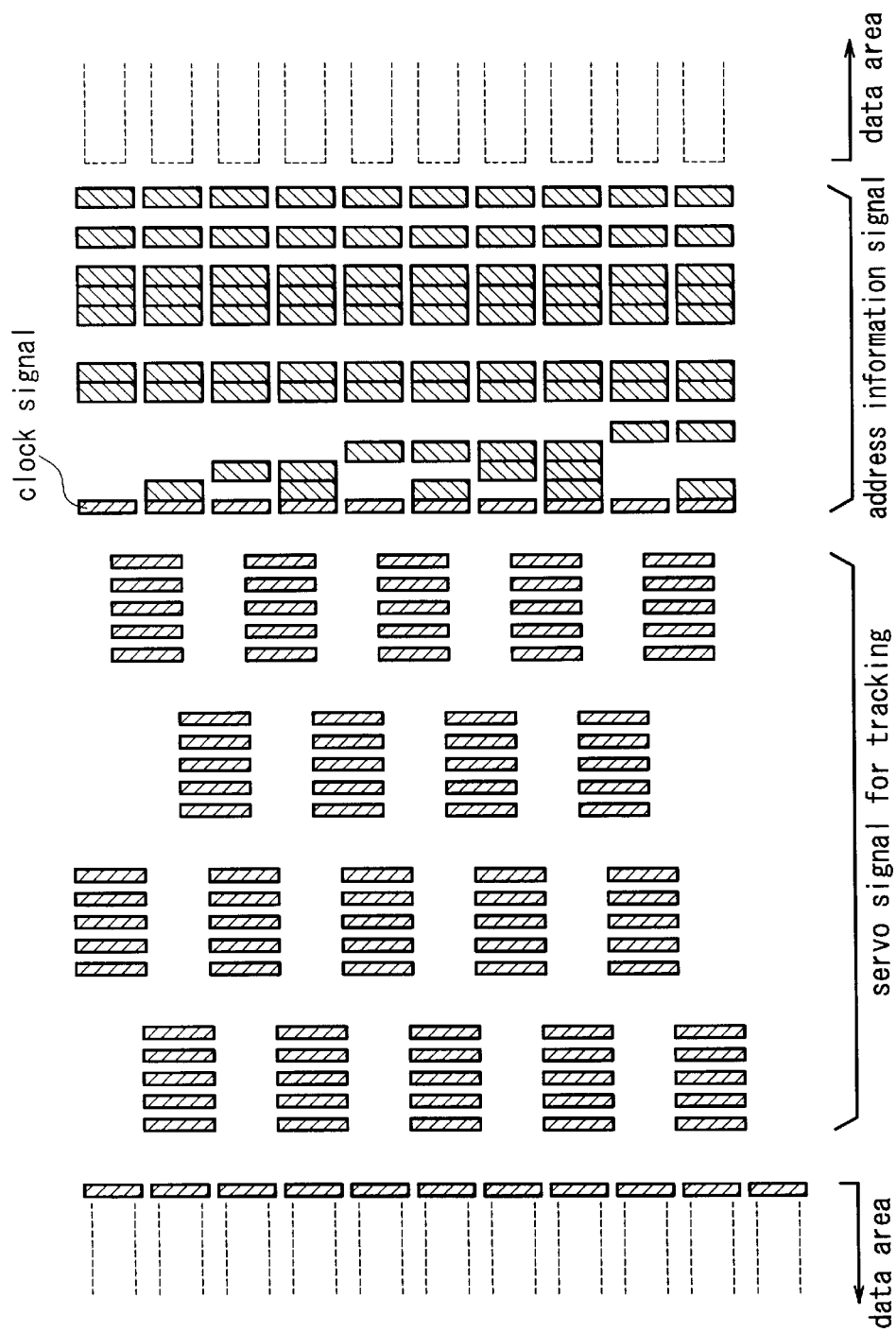
FIG. 10 is a diagram showing a portion A of FIG. 9 in detail in the first embodiment.

An enlarged view of a portion A enclosed by a dotted line in FIG. 9 is shown schematically in FIG. 10. As shown in FIG. 10, a master information pattern including magnetic portions made of ferromagnetic thin films is formed in the signal area 2a with a pattern corresponding to a digital information signal that is recorded in the magnetic disc 1, for example, in a position corresponding to the preformat recording.

In FIG. 10, hatched portions correspond to the magnetic portions made of ferromagnetic thin films. The master information pattern shown in FIG. 10 includes areas arranged in a sequential order in the longitudinal direction of the track, and each area includes a clock signal, a servo signal for tracking, and an address information signal and so forth. In addition, the master information pattern shown in FIG. 10 is an example, and the configuration or the array etc. of the master information pattern will be determined suitably.

For example, as in the case of a hard disc drive, when first a reference signal is recorded in a magnetic film of a hard disc, and a preformat recording of a servo signal for tracking etc. is performed based on this reference signal, only the reference signal used for the preformat recording is transcribed and recorded in advance in the magnetic film of the hard disc using the master information medium according to the present invention. Then, this hard disc is incorporated into a case of the drive, and the preformat recording of the servo signal for tracking etc. may be performed by using the magnetic head in the hard disc drive.

Figure 11:
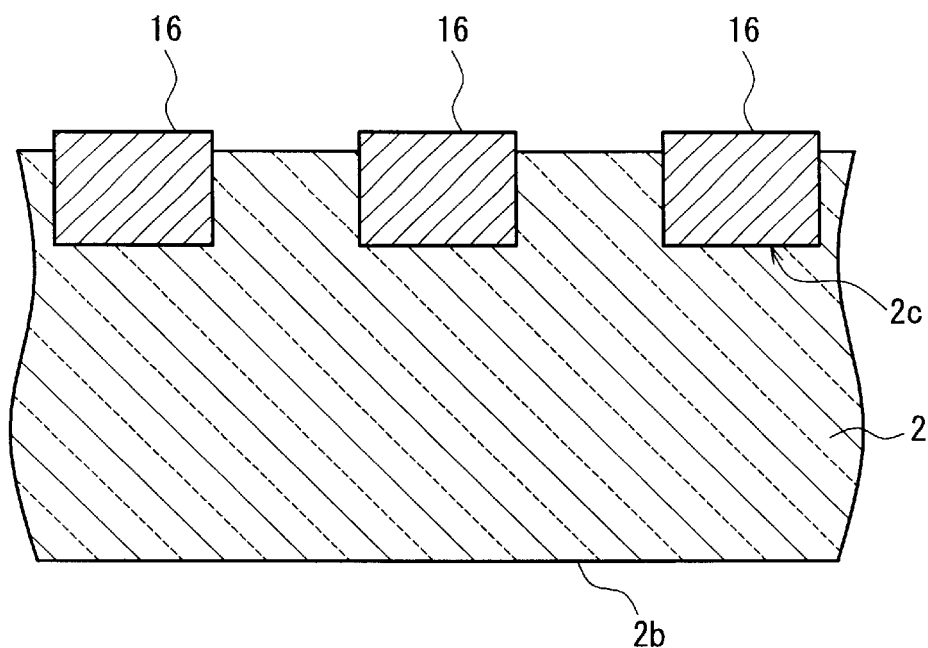
FIG. 11 is a detailed cross-sectional view of the signal area on the master information carrier in the first embodiment.

FIG. 11 shows a partial cross-section of the area shown in FIG. 9 and FIG. 10. As shown in FIG. 11, the magnetic transcription master 2 has a recess portion 2c formed as a plurality of minute array patterns corresponding to the information signal in one principal plane of a disc-shaped base 2b made of a non-magnetic material such as a Si substrate, a glass substrate or a plastic substrate. That is, in the surface of the side contacting the surface of the magnetic disc 1, and a ferromagnetic film 16 serving as the magnetic portion is buried into the recess portion 2c of this base 2b.

Here, many different kinds of magnetic materials can be used as the ferromagnetic thin film 16, regardless of whether it is a hard magnetic material, a semi-hard magnetic material, or a soft magnetic material, as long as the material can perform a transcription recording of a digital information signal in a magnetic recording medium. For example, Fe, Co, Fe—Co alloy or the like can be used.

In addition, in order to generate a sufficient recording magnetic field independently of the type of the magnetic recording medium in which master information is recorded, it is generally preferable that the magnetic material has as large a saturation magnetic flux density as possible. In particular, for a magnetic disc having a high coercive force of more than 2000 oersted or for a flexible disc having a thick magnetic layer, a sufficient recording may not be performed when the saturation magnetic flux density is 0.8 tesla or lower, so that generally a magnetic material having the saturation magnetic flux density of not less than 0.8 tesla, preferably not less than 1.0 tesla, is used. Furthermore, although it depends on the bit length or the saturation magnetization of a magnetic recording medium or the thickness of a magnetic layer, for example in a case where the bit length is set to be about 1 $\mu$m, the saturation magnetization of the magnetic recording medium to be about 500 emu/cc, and the thickness of the magnetic layer in the magnetic recording medium to be about 20 nm, the thickness of the ferromagnetic thin film 16 preferably is in a range of about 50 nm to 500 nm.

Here, in order to obtain a recording signal of an excellent quality in such a recording system, it is preferable to excite and uniformly magnetize the array pattern of a soft magnetic thin film or a semi-hard magnetic thin film provided as the ferromagnetic thin film in the magnetic transcription master at the time a preformat recording is performed. Furthermore, it is preferable that uniform initial magnetization is performed for the magnetic recording medium such as a hard disc prior to performing a signal recording using the magnetic transcription master 2.

Figure 8:
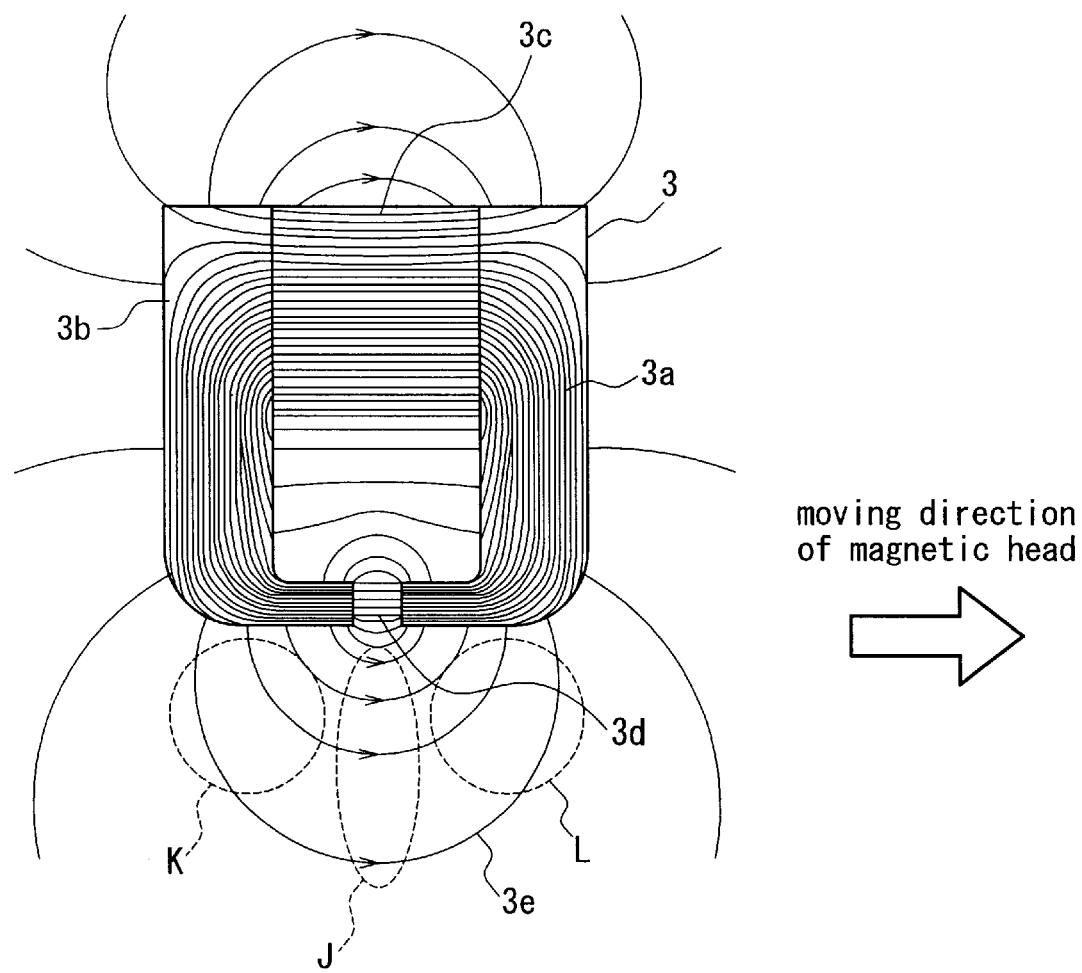
FIG. 8 is a cross-sectional view of the magnetic head in the first embodiment.

Next, the magnetic head for transcription 3 will be described. FIG. 8 shows a cross-sectional view of the magnetic head for transcription 3 in the circumferential direction of the magnetic disc 1 and a distribution of magnetic lines of force in the generated magnetic field. In the drawing, 3a and 3b are a pair of magnetic cores, and the material used is a ferromagnetic material, for example, SS41 or the like.

3c is a permanent magnet, and the material used is a material having high residual magnetic flux density such as a neodymium-, an iron-, a boron-type material or the like. 3d is a gap, and 3e is a magnetic line of force in the generated magnetic field. An area J enclosed elliptically by a dotted line in the drawing is a portion corresponding to a horizontal magnetic field component used for transcription. On the other hand, areas K and L are portions corresponding to vertical magnetic field components causing signal deterioration in the conventional example.

Next, a method for manufacturing such a magnetic transcription master 2 will be explained. Specifically, the magnetic transcription master used for the recording system of the present invention is formed in the following steps: a resist film is formed on the surface of a Si substrate; the resist film is exposed and developed for patterning by a laser beam such as in photolithography or by the lithographic technique using an electron beam; the resist film is etched by dry etching etc. to form a minute uneven shape corresponding to an information signal; and a ferromagnetic thin film made of Co etc. is formed by sputtering, vacuum evaporation, ion plating, CVD, plating or the like in such a manner that the ferromagnetic thin film is buried in the recess portions, so that a magnetic transcription master provided with a magnetic portion corresponding to the information signal can be obtained.

In addition, the method for forming an uneven shape in the surface of the magnetic transcription master is not limited to the methods mentioned above. It is also possible, for example, to form a minute uneven shape directly by means of a laser, an electron beam or an ion beam, or to form a minute uneven shape directly by machining.

Next, the process of performing a transcription recording of the information signal corresponding to the pattern shape formed in the magnetic transcription master 2 for the magnetic disc 1 will be explained more in detail. FIG. 5 shows the steps of transcription in the present embodiment. The explanation follows the order of the steps shown in the drawing.

Figure 6:
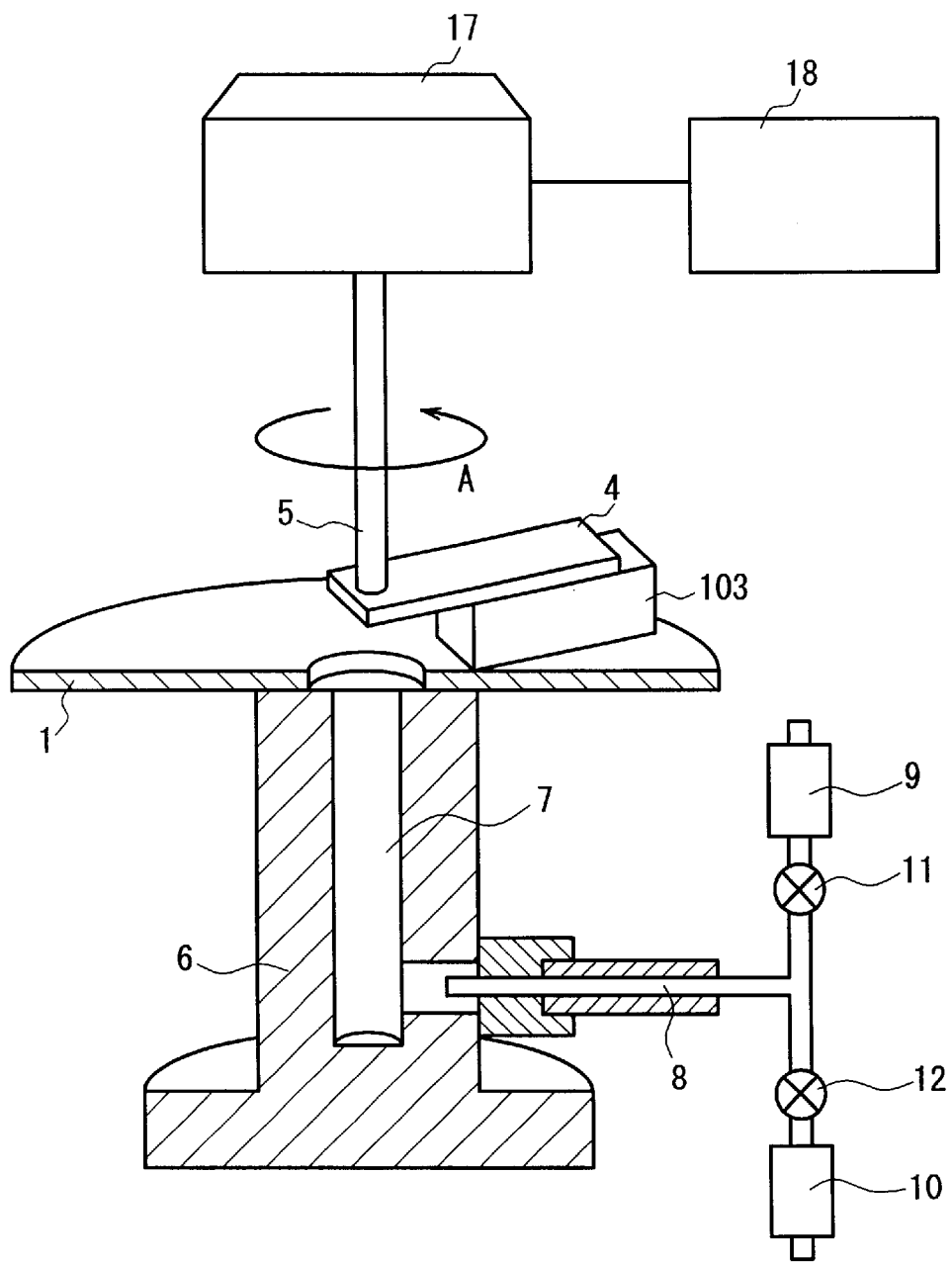
FIG. 6 is a diagram showing the method for performing initial magnetization for the magnetic disc in the first embodiment.

First, initial magnetization of the magnetic disc 1 is performed. The configuration of the magnetic head driving mechanism 17 and the control circuit 18 is the same as that for the magnetic head for transcription 3. As shown in FIG. 6, the present embodiment shows a state in which a gap portion of a magnetic head for initial magnetization 103 (with the same configuration as a magnetic head for transcription to be described later in which the polarity of a permanent magnet is opposite) is brought as close to the magnetic disc 1 as a distance of 0.3 mm (approach of the magnetic head for initial magnetization).

Next, the magnetic head driving mechanism 17 is driven, based on a signal of the control circuit 18, in the direction indicated by an arrow A in FIG. 6 by taking substantially the central part of the magnetic disc 1 as the rotation axis, and the magnetic head for initial magnetization 103 is rotated parallel to the magnetic disc 1 through at least 360 degrees, for example, 450 degrees. Thus, the magnetization direction of the magnetic disc 1 is determined in advance in one direction as shown by the arrows in FIG. 12 (initial magnetization). In a stage in which the initial magnetization is completed, the magnetic head for initial magnetization 103 is separated from the magnetic disc 1 while the rotation is maintained (separation of the magnetic head for initial magnetization).

Next, while maintaining a state in which the magnetic transcription master 2 is positioned and overlapped on the magnetic disc 1, the magnetic transcription master 2 and the magnetic disc 1 are brought uniformly into a close contact with each other by the method mentioned above. Furthermore, the magnetic head for transcription 3 is shifted by the magnetic head driving mechanism 17 in the direction indicated by arrow B in FIG. 1, and the gap 3d of the magnetic head for transcription 3 is allowed to approach the magnetic disc 1 to a distance of 1.5 mm (approaching of the magnetic head for transcription).

Then, the magnetic head for transcription 3 is rotated parallel to the magnetic disc 1 at a speed of 60 revolutions per minute in the direction indicated by the arrow A in FIG. 1 with the magnetic head driving mechanism 17, taking substantially the central part of the magnetic disc 1 as the center. According to the present operation, a magnetic field is applied in the opposite direction to the initial magnetization.

Figure 13:
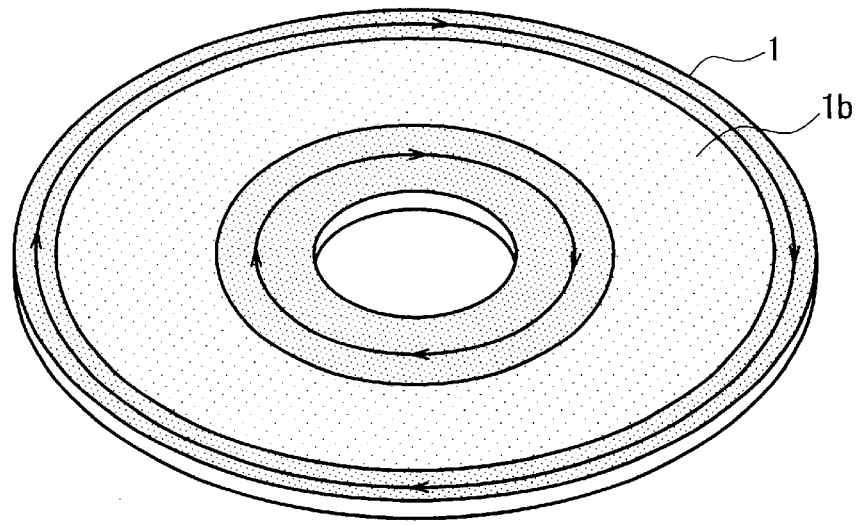
FIG. 13 is a diagram showing the direction in which a magnetic field for transcription is applied to the magnetic disc in the first embodiment.
Figure 14:
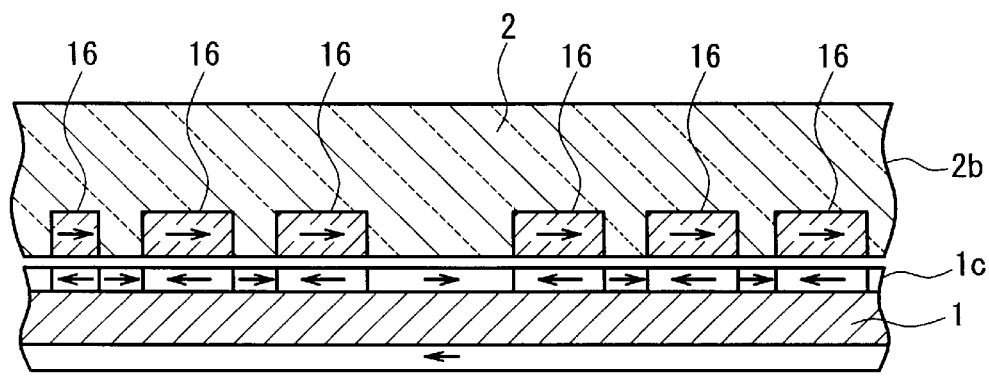
FIG. 14 is a diagram showing the state of magnetization for the master information carrier and the magnetic disc at the time of transcription in the first embodiment.

FIG. 14 shows how this magnetization processing is performed. As shown in FIG. 14, a magnetic field is applied from the outside to the magnetic transcription master 2 in a state in which the magnetic transcription master 2 and the magnetic disc 1 are in close contact with each other so as to magnetize the magnetic portion 16. In this way, an information signal can be recorded in a ferromagnetic layer 1c of the magnetic disc 1. In other words, by using the magnetic transcription master 2 including the non-magnetic base 2b on which the magnetic portions 16 made of ferromagnetic thin films are formed in the form of array patterns corresponding to a predetermined information signal, a transcription recording can be performed magnetically for the magnetic disc 1 as a magnetization pattern corresponding to this information signal. In addition, an arrow shown in FIG. 13 shows the magnetic field direction of the magnetization pattern to be transcribed and recorded at this time in the magnetic disc 1 (transcription).

Here, the operation at the time of transcription will be described in more detail. FIG. 7 shows the relationship of a rotational phase of the magnetic head for transcription 3 to a rotation speed of the magnetic head for transcription 3 as well as to a distance between the gap 3d of the magnetic head for transcription 3 and the surface of the magnetic disc 1 at the time of transcription.

Here, the transcription is completed when the magnetic head for transcription 3 is rotated for 360 degrees or more, but the magnetic head for transcription 3 maintains its rotation also thereafter at 60 revolutions per minute. In the example shown in this drawing, when the rotational phase of the magnetic head for transcription 3 reaches 450 degrees, the magnetic head for transcription 3 is shifted in the direction indicated by an arrow C in FIG. 1 and starts to separate from the magnetic disc 1 until the rotational phase reaches 540 degrees, at which point the separation is completed. Also during this separating operation, the magnetic head for transcription 3 maintains its rotational operation.

In the present embodiment, the separation distance at this time was set to be 3 mm. The operation at the time of initial magnetization also is the same except that the distance of the magnetic head with respect to the magnetic disc 1 is different.

Figure 22:
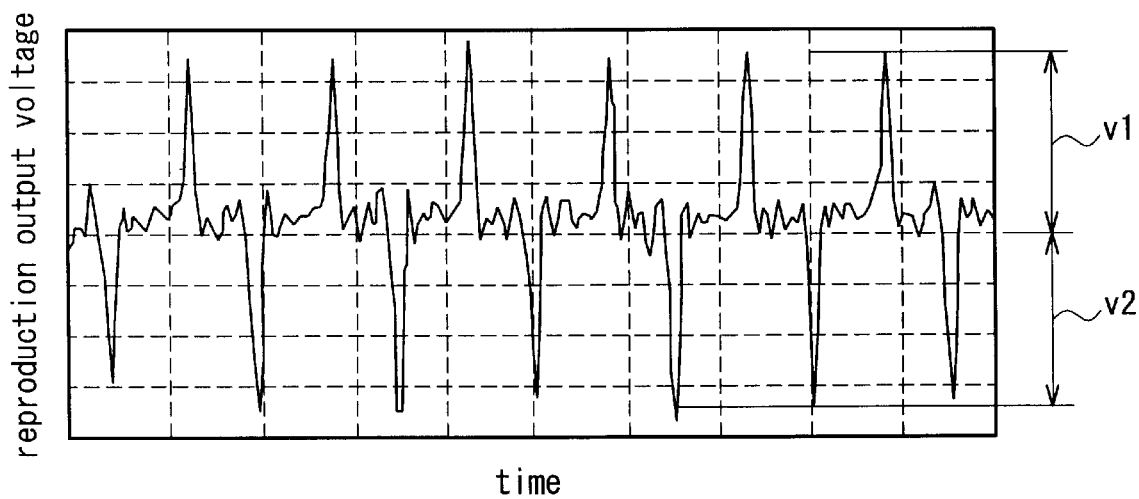
FIG. 22 is a graph showing the waveform of a reproduction signal in a position where the magnetic head for transcription starts to be separated in the first embodiment.

Thereafter, the transcription master 2 is separated according to the method described above. FIG. 21 and FIG. 22 show the results of reproducing the signal recorded in the magnetic disc 1 according to the present embodiment using a floating magnetic head used in fact for a magnetic disc device (on which a magneto-resistive effect element is mounted) and a spin stand device.

Figure 16A:
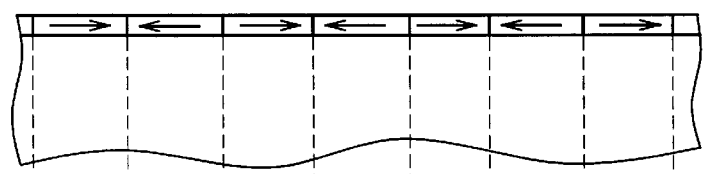
FIG. 16A is a schematic view showing a magnetic disc cross-section in an excellent recording condition.
Figure 16B:
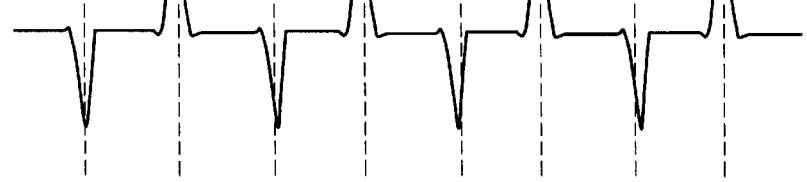
FIG. 16B is a graph showing a corresponding reproduction signal.
Figure 35:
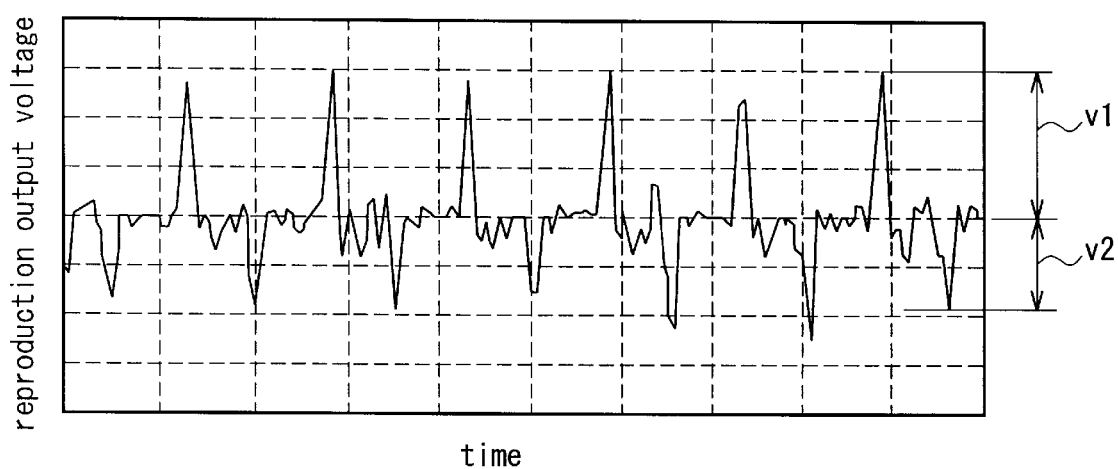
FIG. 35 is a graph showing a waveform of the reproduction signal in a position where the magnetic head for transcription starts to be separated in the conventional example.

FIG. 21 shows the rotational phase of the magnetic disc 1 and the peak value of a reproduction signal voltage. FIG. 22 shows a reproduction waveform in the phase of separating the magnetic head for transcription 3 in FIG. 21. As is clear from FIG. 22, the voltages v1 and v2 substantially coincide with each other with respect to their reproduction waveforms, and a significant drop in the peak level as is observed in FIG. 35 for the conventional example does not occur. That is, the separation of the magnetic head for transcription 3 is performed in a state in which the rotational operation is maintained, so that the deterioration of the reproduction signal can be prevented. Accordingly, a variance in the amplitude of the reproduction waveform also can be suppressed over the entire area of the rotational phase. In other words, according to the present embodiment, uniform transcription recording can be achieved over the entire magnetic recording medium.

the present invention can achieve uniform transcription recording the present embodiment FIGS. 16A and 16B are schematic diagrams respectively showing the state of magnetization remaining in the magnetic layer of the magnetic disc 1 in this state and a waveform of a reproduction signal when using a ring head corresponding thereto. Here, the direction of the arrow shows the direction of the magnetic field, and the length shows the magnetic field strength. The ring head (not shown in the drawing) converts a change in the magnetic flux crossing the gap into an electric current. Therefore, by approaching and scanning the magnetic disc 1 that is magnetized as in FIG. 16A, the leakage flux from the magnetic disc 1 can be detected, and a waveform of a reproduction signal as shown in FIG. 16B can be obtained.

Here will be explained a difference in the state of applying an external magnetic field at the time of separating the conventional example and the magnetic head 3 of the present embodiment and also with respect to the reason why a drop in the peak value of a waveform of a reproduction signal does not occur in the present embodiment. In FIG. 15, a line segment FF shows the substantial height of a contact surface of the transcription master 2 with the disc 1.

Figure 18:
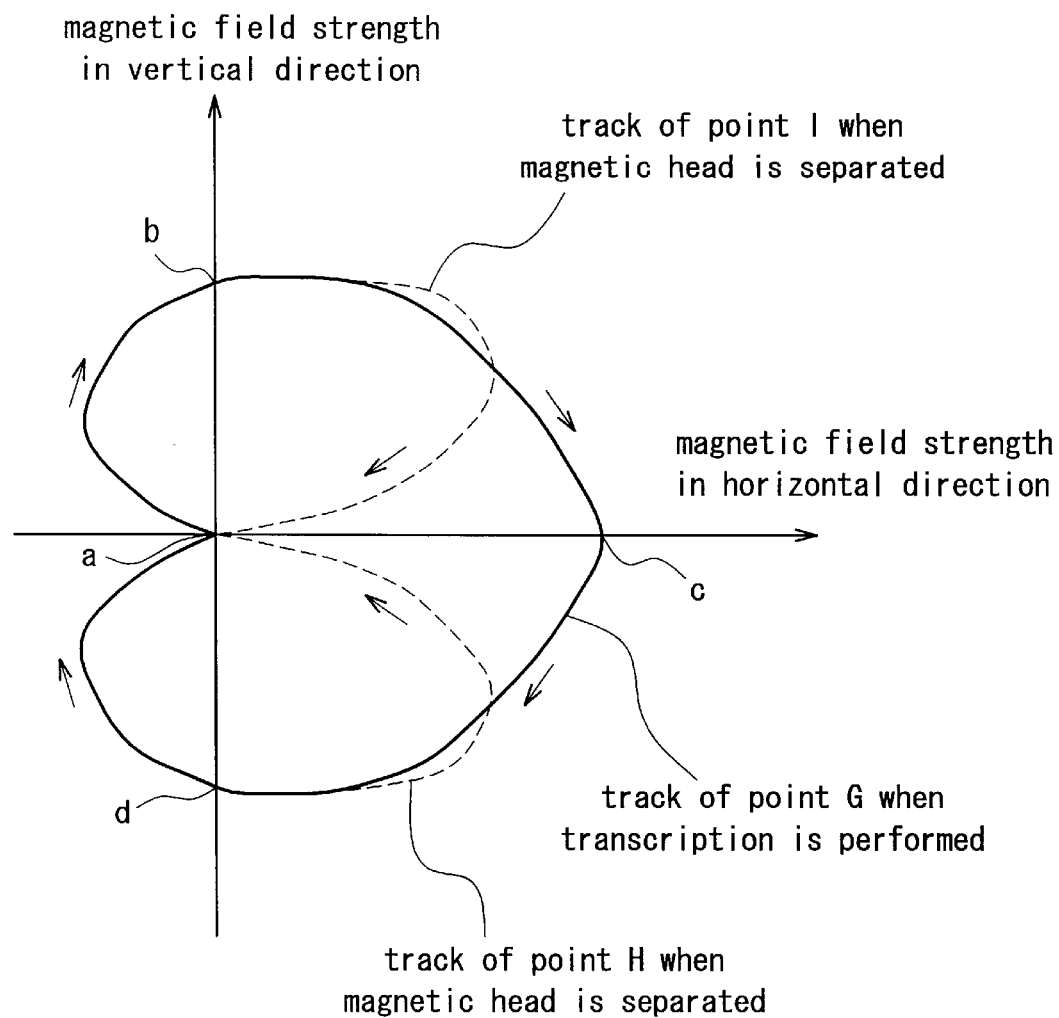
FIG. 18 is a diagram schematically showing the history of a magnetic field for transcription and a magnetic field at the time the magnetic head is separated.

FIG. 18 shows the history of a magnetic field applied to a point G on the line segment FF when the magnetic head 3 is shifted in the right direction of the drawing. The lateral axis in FIG. 18 shows a magnetic field strength component horizontal to the transcription master 2, and the vertical axis shows a magnetic field strength component perpendicular to the transcription master 2.

The magnetic field strength in the horizontal direction is determined to be positive for the magnetic field moving toward the right direction in the drawing, and the magnetic field strength in the vertical direction is determined to be positive for the magnetic field moving toward the upper direction in the drawing. A curve shown here by a solid line is the history of the magnetic field when the magnetic head 3 passes through the point G at the time of transcription.

The history of a magnetic field at the point G shown in FIG. 18 will be explained by comparison with FIG. 8. A point a in FIG. 18 corresponds to a point in time when the magnetic head 3 is located sufficiently far away from the point G. As it proceeds from the point a toward a point b, the vertical magnetic field increases and reaches its peak at the point b. As it proceeds from the point b toward a point c, the vertical magnetic field is reduced, and at the same time, the horizontal magnetic field increases and reaches its peak at the point c. This corresponds to the fact that the point G passes through in order of the vertical magnetic field L and the horizontal magnetic field J. In other words, as the vertical magnetic field L approaches the point G, the vertical magnetic field at the point G is increased, and as the vertical magnetic field L moves away from the point G and the horizontal magnetic field J approaches the point G, the horizontal magnetic field is increased.

In addition, as it proceeds from the point c toward a point d, the horizontal magnetic field is reduced, and at the same time, the vertical magnetic field increases in the negative direction and reaches its peak at the point d. When the point a is reached via the point d, both the vertical magnetic field and the horizontal magnetic field become zero. This corresponds to the fact that the point G passes through in order of the horizontal magnetic field J and the vertical magnetic field K. At the point a where the magnetic head is located sufficiently far away from the point G, the respective magnetic fields become zero. In other words, as the horizontal magnetic field J moves away from the point G, the horizontal magnetic field at the point G is reduced, and as the vertical magnetic field K approaches the point G, the vertical magnetic field at the point G is increased.

The dotted lines in FIG. 18 show as comparative examples the histories of magnetic fields applied to a point H and a point I in FIG. 17 when the magnetic head 3 is separated in the vertical direction. When the magnetic head 3 is separated in the vertical direction, the point H and the point I are positions where the level of the recording signal drops particularly greatly. The point b and the point d respectively correspond to the magnetic fields at the point I and the point H when the magnetic head is located in the starting point. As the magnetic head 3 moves far away from the transcription master 2, the horizontal magnetic field reaches its peak value, but this peak value is lower than the track shown by the solid line. Furthermore, with respect to the solid line, the point at which the horizontal magnetic field reaches its peak value has not vertical magnetic field, but in the track of the dotted line, a considerable amount of vertical magnetic field is applied.

As is shown here, the histories of the magnetic fields applied to the transcription master 2 differ greatly in the cases where the magnetic head 3 passes through and separates in the vertical direction, and this difference is the cause for the deterioration occurring in the recording signal only in the phase in which the magnetic head 3 is separated.

Figure 20A:
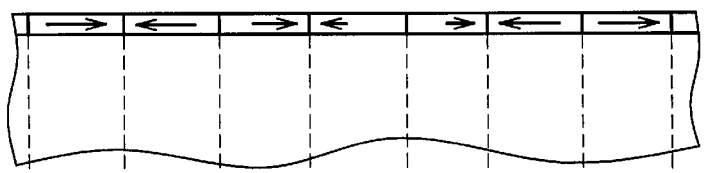
FIG. 20A is a schematic diagram showing a magnetic disc cross-section in a state in which a recording signal is partially demagnetized.
Figure 20B:
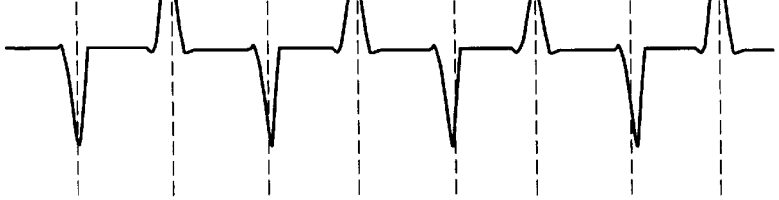
FIG. 20B is a graph showing a corresponding reproduction signal.

FIGS. 20A and 20B are schematic diagrams respectively showing the state of magnetization of the magnetic layer in the phase of separating the magnetic head 3 from the magnetic disc 1 and a signal waveform reproduced by using a magnetic head to be mounted on a corresponding actual hard disc drive in the conventional example. As in FIGS. 16A, 16B, the direction of the arrow shows the direction of the magnetic field, and the length shows the magnetic field strength. As is observed here, due to the strength of magnetization becoming partially weak, a drop in the reproduction signal voltage occurs in accordance thereto.

Figure 19:
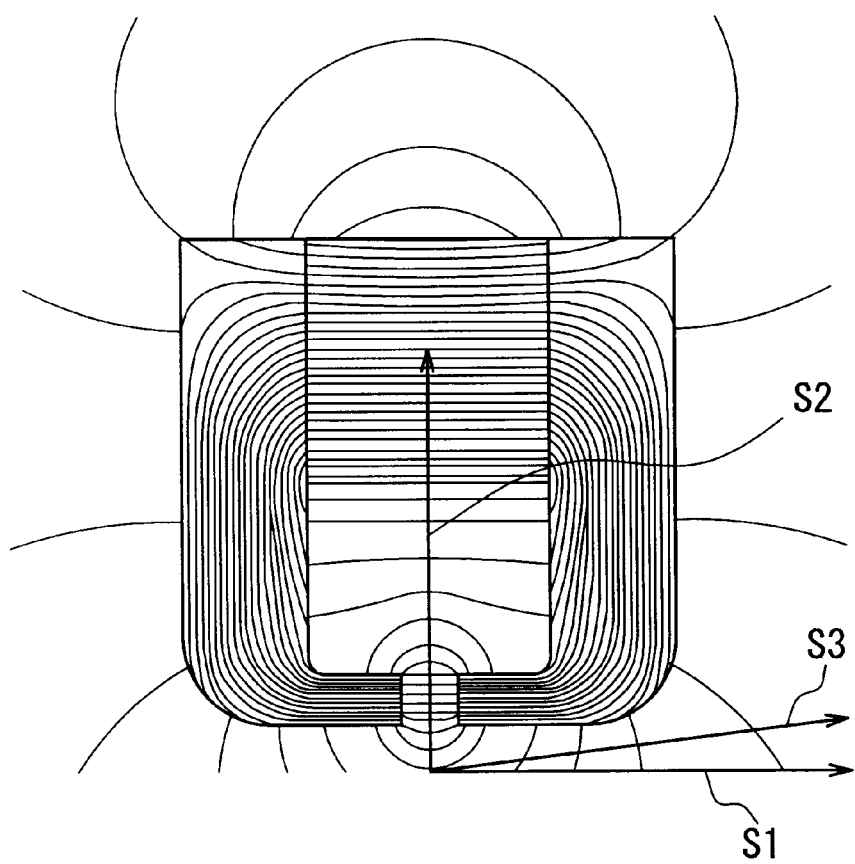
FIG. 19 is a diagram showing the relative velocity of the magnetic head 3 to the transcription master 2 as velocity vectors.

FIG. 19 shows the relative velocity of the magnetic head 3 to the transcription master 2 as velocity vectors at the time of transcription, at the time the magnetic head 3 is separated in the conventional example, and at the time the magnetic head 3 is separated in the present embodiment. In the drawing, S1 shows the velocity vector at the time of transcription; S2 shows the velocity vector at the time the magnetic head 3 is separated in the conventional example; and S3 shows the velocity vector at the time the magnetic head 3 is separated in the present embodiment.

As is observed here, the relative velocity of the magnetic head 3 to the transcription master 2 at the time the magnetic head 3 is separated in the present embodiment of the present invention becomes closer to the velocity vector at the time of transcription compared to the conventional example, since it is rotating also at the time the magnetic head 3 is separated. Therefore, a substantially similar shape with the history of the magnetic field strength shown by the solid line in FIG. 18 is maintained until the magnetic field to be applied to the transcription master from the magnetic head 3 is reduced sufficiently. As a result, the demagnetization in the recording signal arising at the time of separation in the conventional example is eased substantially.

As described above, it is possible to obtain a great effect according to the present embodiment in that an excellent transcription can be achieved over the entire surface of the magnetic disc 1 by changing a part of the transcription process with respect to the conventional method.

In addition, in the configuration of the present embodiment, the magnetic head for transcription 3 was driven to rotate, but exactly the same effect can be obtained also by driving the side of the magnetic disc 1 to rotate. In other words, it is sufficient to rotate the magnetic head for transcription 3 relative to the side of the magnetic disc 1, and both the magnetic head for transcription 3 and the side of the magnetic disc 1 may be driven rotatively.

Furthermore, in the description of the present embodiment, the magnetic head for transcription 3 included a magnetic core and a permanent magnet. However, as long as the same external magnetic field as shown in FIG. 8 is generated, it is also possible to use, for example, an electromagnet made of a magnetic core and a coil. Although a detailed explanation is omitted here, it is designed to perform the same operation also for the operation at the time of initial magnetization. Furthermore, the present embodiment was described by referring to an example in which the magnetic recording medium is an inplane recording medium. However, the same effect can be obtained also in the case of using the present magnetic transcription device for transcription for a vertical recording medium.

[Second Embodiment]

Next, another embodiment of the present invention will be explained. As for the contents that are the same as those in the first embodiment, the explanation thereof is omitted. The object of the first embodiment was to solve the problem of signal deterioration in the position where the magnetic head for transcription 3 is separated. However, also at the time the magnetic head for transcription 3 is approaching, signal deterioration also can be observed in a close position due to conditions of transcription, for example, when a recording signal is not overwritten completely when the magnetic head for transcription 3 passes the close position again.

Figure 23:
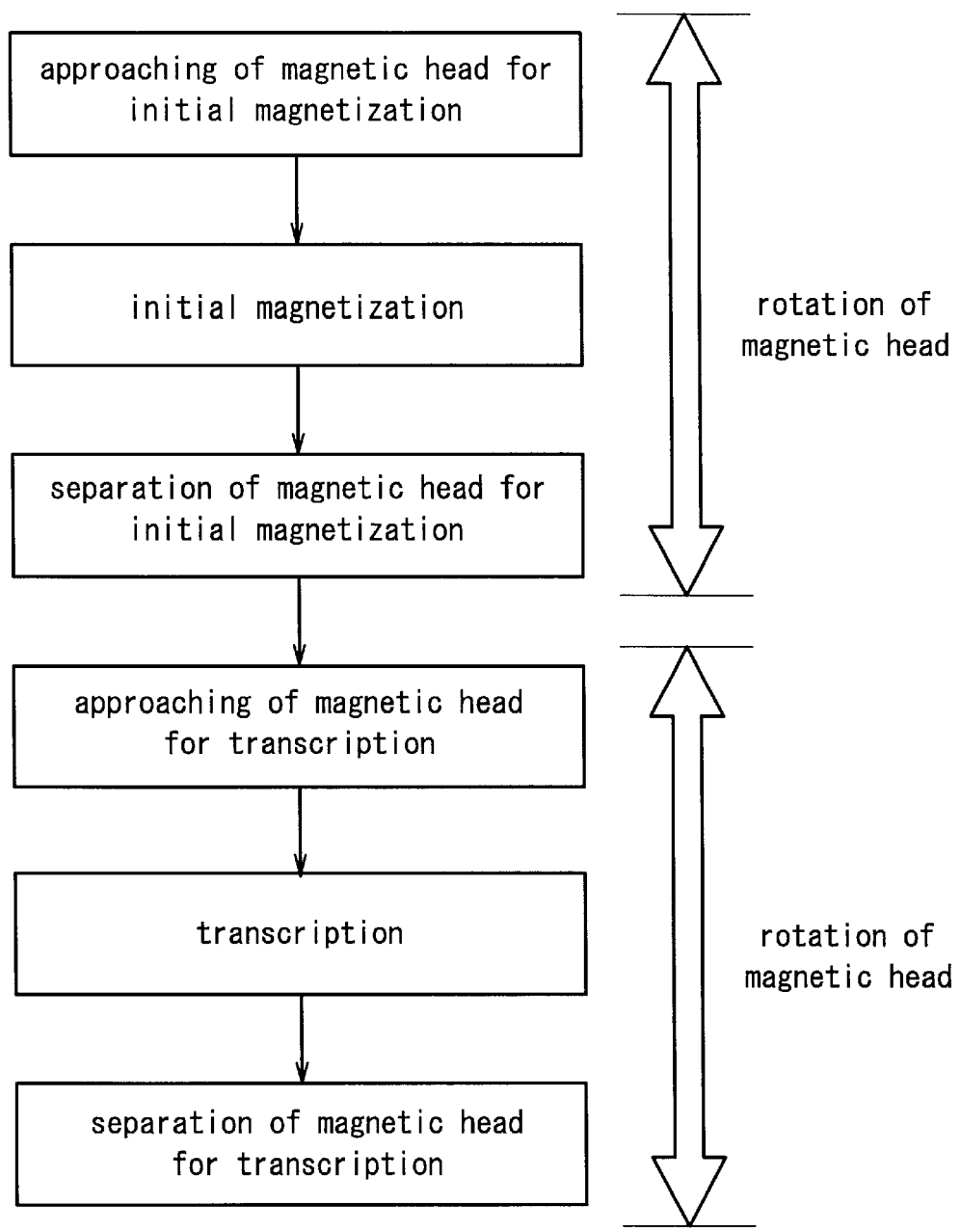
FIG. 23 is a flowchart showing the steps of transcription in a second embodiment.

Therefore, the first embodiment included the step of performing the separation of the magnetic head for transcription 3 simultaneously with the rotational operation only when the magnetic head for transcription 3 is separated, whereas the present embodiment follows the steps shown in FIG. 23 in that the approaching operation of the magnetic head for transcription 3 is performed simultaneously with the rotational operation, like at the time of separation, when the magnetic head for transcription 3 approaches.

Figure 24:
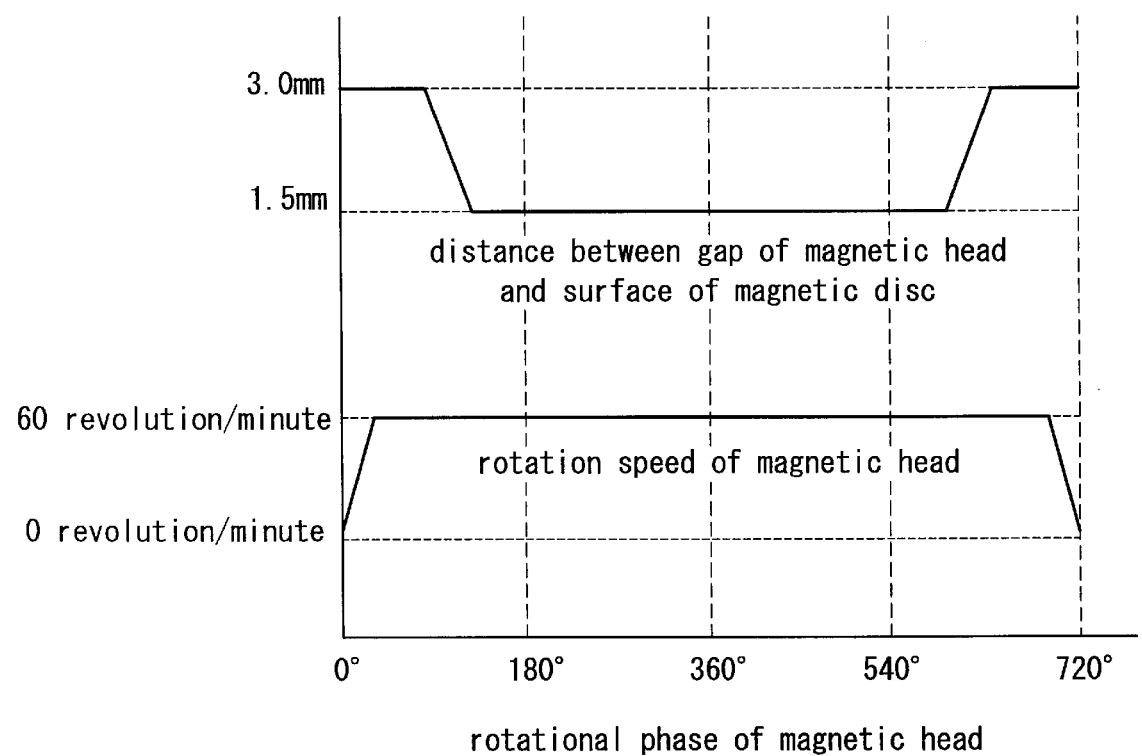
FIG. 24 is a graph showing the relationship of a rotational phase of a magnetic head to a rotation speed of the magnetic head and a distance between a gap of the magnetic head and a surface of a magnetic recording medium at the time of transcription in the second embodiment.

FIG. 24 shows the relationship of a rotational phase of the magnetic head for transcription 3 to a rotation speed of the magnetic head for transcription 3 and a distance between the gap 3d of the magnetic head for transcription 3 and the surface of the magnetic disc 1 at the time of transcription. As shown in this drawing, the magnetic head rotates at 60 revolutions per minute at both times when the operation is performed in that the distance between the gap 3d of the magnetic head for transcription 3 and the surface of the magnetic disc 1 approaches from 3 mm to 1.5 mm and separates from 1.5 mm to 3 mm.

By determining the steps as such, a signal recording can be performed with higher reliability in a wide range of transcription conditions.

[Third Embodiment]

Figure 26:
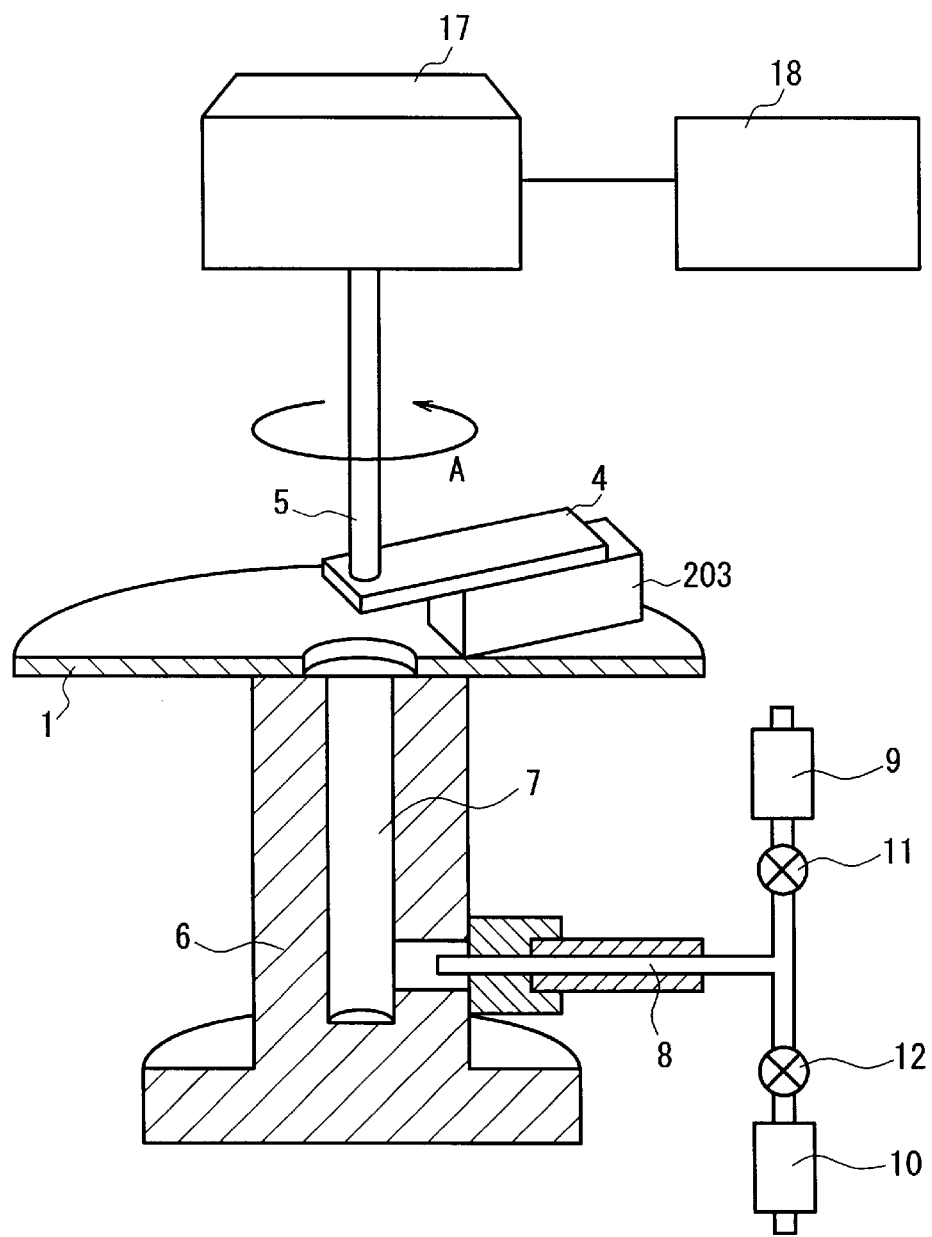
FIG. 26 is a cross-sectional view of the magnetic transcription device at the time of initial magnetization in the third embodiment.
Figure 29:
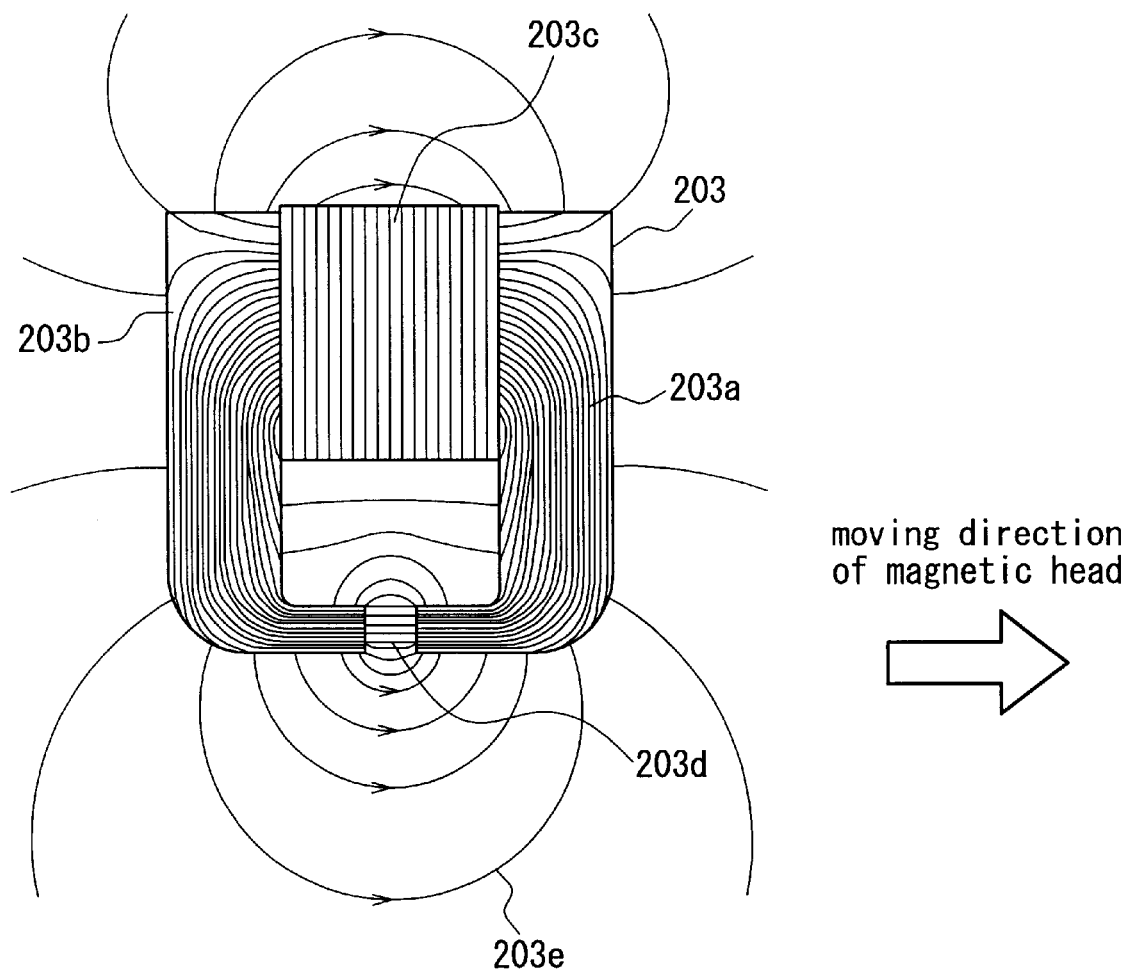
FIG. 29 is a cross-sectional view of a magnetic head in the third embodiment.

Next, a third embodiment of the present invention will be explained. As for the contents that are the same as those in the first embodiment, the explanation thereof is omitted. FIG. 25 and FIG. 26 show magnetic transcription devices in the present embodiment. FIG. 29 shows a cross-sectional view of a magnetic head 203 in the circumferential direction of the magnetic disc 1 and a distribution of magnetic lines of force in the generated magnetic field in the present embodiment.

In the drawing, 203a and 203b are a pair of magnetic cores made of a ferromagnetic material; 203c is a coil; 203d is a gap; and 203e is a magnetic line of force. In the first and second embodiments, an external magnetic field was applied and removed by bringing the magnetic head closer or farther away. On the other hand, an external magnetic field is applied and removed in the present embodiment by controlling an electric current to be supplied to the coil 203c.

Figure 27:
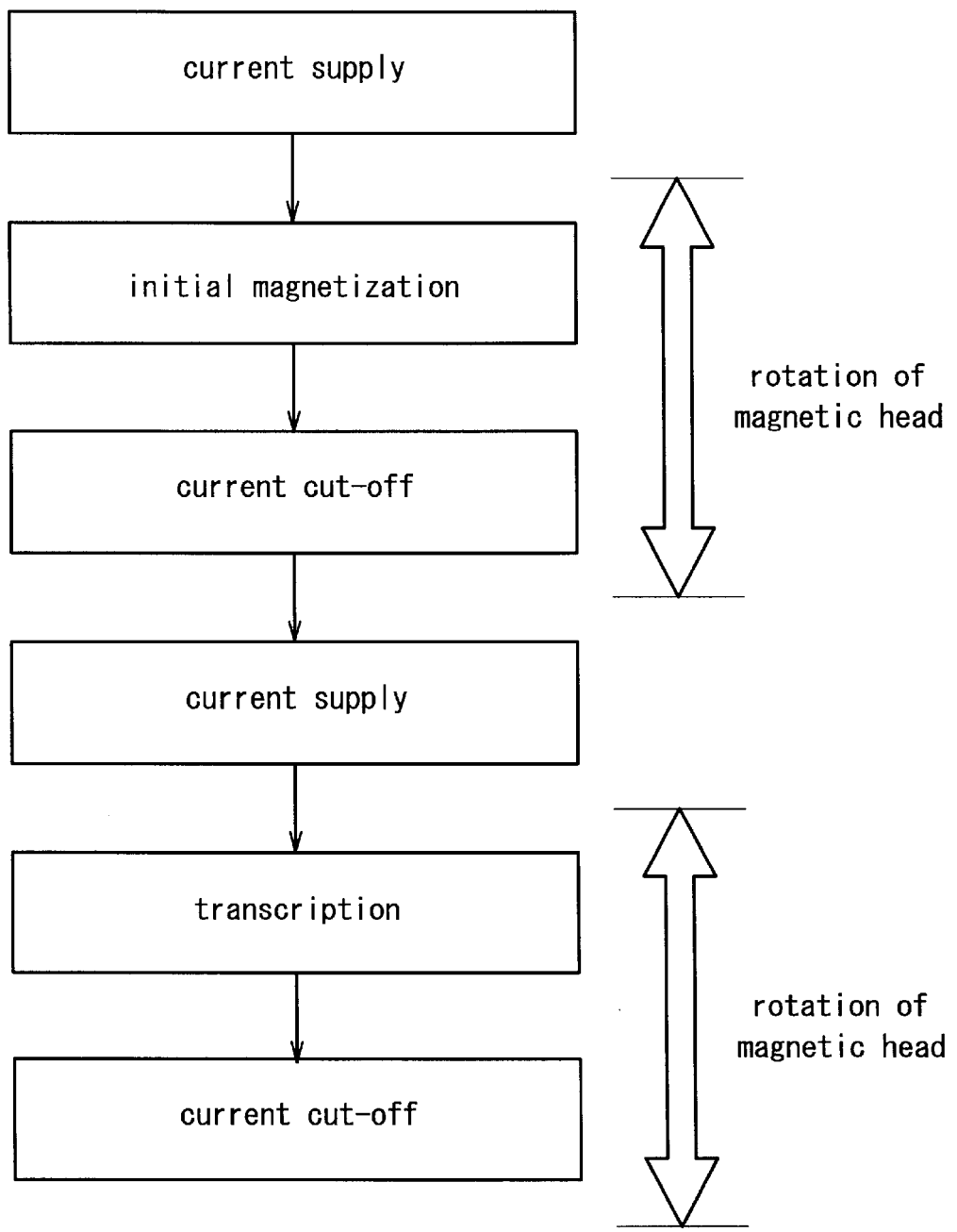
FIG. 27 is a flowchart showing the steps of transcription in the third embodiment.

Here, the process of performing a transcription recording of the information signal corresponding to the pattern shape formed in the magnetic transcription master 2 for a magnetic disc will be explained with reference to FIG. 25 to FIG. 27. First, in the state in which the magnetic disc 1 is mounted on the supporting stand 6 as shown in FIG. 26, a gap portion 203d of the magnetic head 203 is brought close to the magnetic disc 1, for example, as close as a distance of 0.3 mm (approaching of the magnetic head). In this state, an electric current of 20A, for example, is supplied to the coil 203c of the magnetic head 203 to generate a magnetic field.

Figure 12:
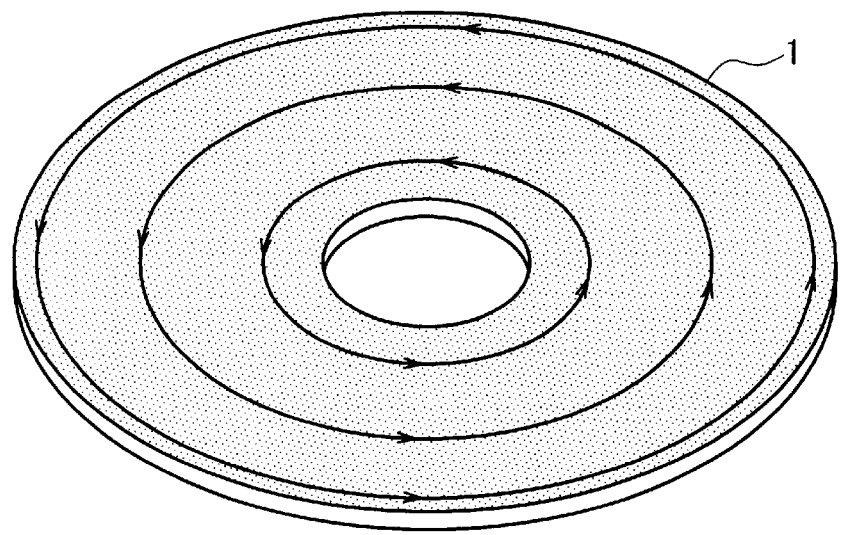
FIG. 12 is a diagram showing the state of initial magnetization of the magnetic disc in the first embodiment.

Next, the rotation axis 5 is rotated, taking substantially the central part of the magnetic disc 1 as the center, in the direction indicated by an arrow A in FIG. 26, so that the magnetic head 203 is rotated at least 360 degrees, for example, 450 degrees. Thus, the magnetization direction is determined in advance in one direction for the magnetic disc 1 as shown by the arrow of FIG. 12 (initial magnetization).

Then, in the state in which the rotation of the magnetic head 203 is maintained, the value of the electric current to be supplied to the coil 203c is reduced gradually. Thereafter, the magnetic head 203 is separated temporarily from the disc 1.

Next, as shown in FIG. 25, while maintaining a state in which the magnetic transcription master 2 is positioned and overlapped on the magnetic disc 1, the magnetic transcription master 2 and the magnetic disc 1 are brought uniformly into a close contact with each other. In this state, the gap 203d of the magnetic head 203 is allowed to approach the magnetic disc 1, for example, as close as up to a distance of 1.5 mm (approaching of the magnetic head). Thereafter, an electric current of 20A, for example, is supplied again to the coil 203c this time in the opposite direction to the time of initial magnetization (transcription).

Here, the operation at the time of transcription will be explained more in detail. FIG. 28 shows the relationship of a rotational phase of the magnetic head to a rotation speed of the magnetic head and a current value applied to the coil of the magnetic at the time of transcription in the third embodiment. A transcription is completed when the magnetic head 203 is rotated 360 degrees or more, but at the point when the magnetic head 203 is rotated 450 degrees while maintaining the rotation as it is, the value of the electric current to be supplied to the coil 203c is reduced gradually.

More specifically, the coil current is reduced from 20A to 0A when the rotational phase changes from 450 degrees to 540 degrees. During this period, the magnetic head 203 maintains its rotation at 60 revolutions per minute. In the present embodiment, the current value is reduced gradually while rotating the magnetic head 203, so that the transcription is completed without separating the magnetic head 203.

The operation at the time of initial magnetization also is the same except that the distance of the magnetic head with respect to the magnetic disc 1 is different. By determining the steps as such, the same effect as that in the first embodiment can be obtained. By using an electromagnet for the magnetic head as described above, the magnetic head for initial magnetization and the magnetic head for transcription can be used commonly. In addition, a magnetic field can be applied and removed by controlling the electric current, so that it is advantageous for the device to have improved design flexibility.

Furthermore, the present embodiment was described by referring to an example in which the magnetic recording medium is an inplane recording medium. However, the same effect can be obtained also in the case of using the present magnetic transcription device for transcription for a vertical recording medium.

[Fourth Embodiment]

Figure 30:
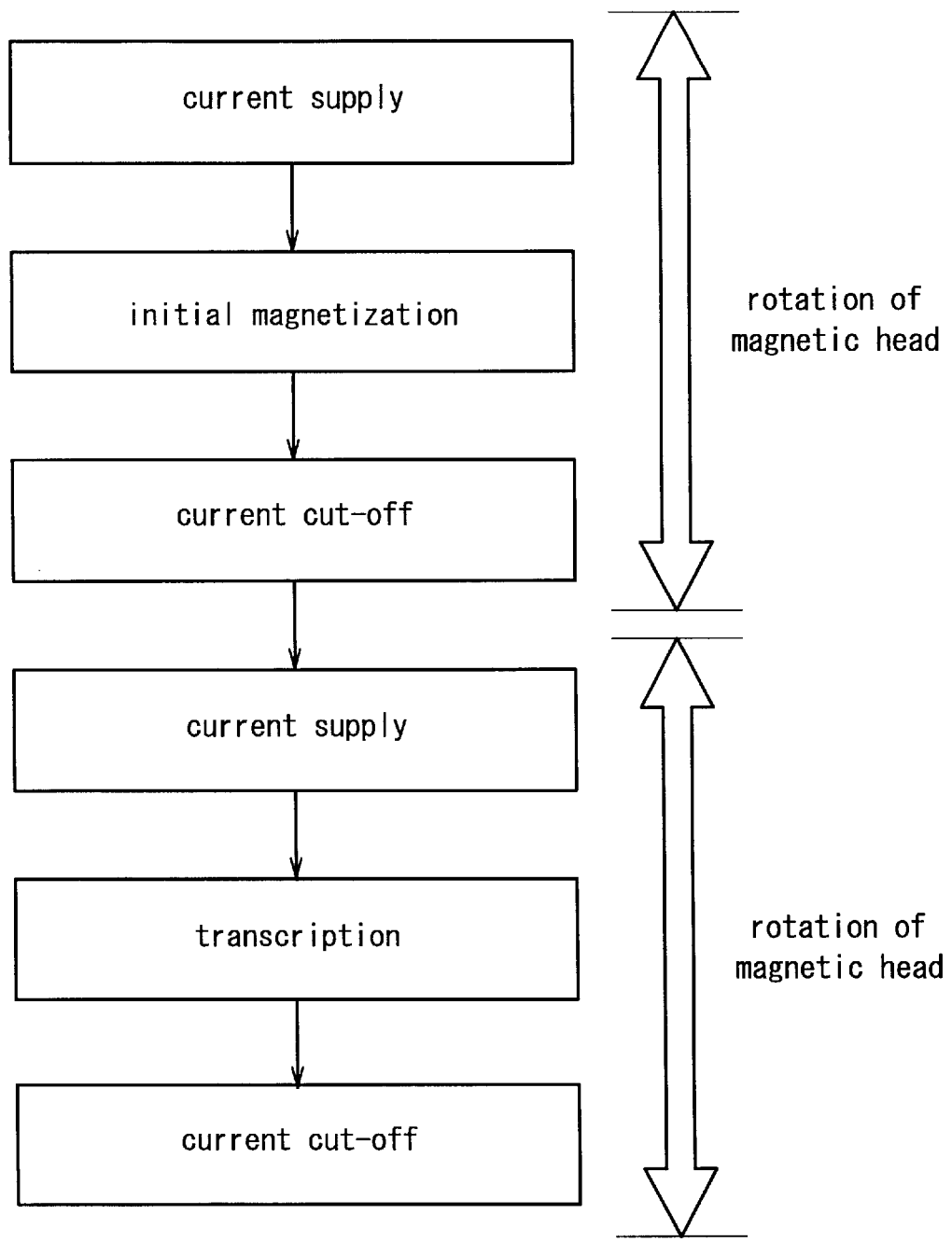
FIG. 30 is a flowchart showing the steps of transcription in a fourth embodiment.
Figure 31:
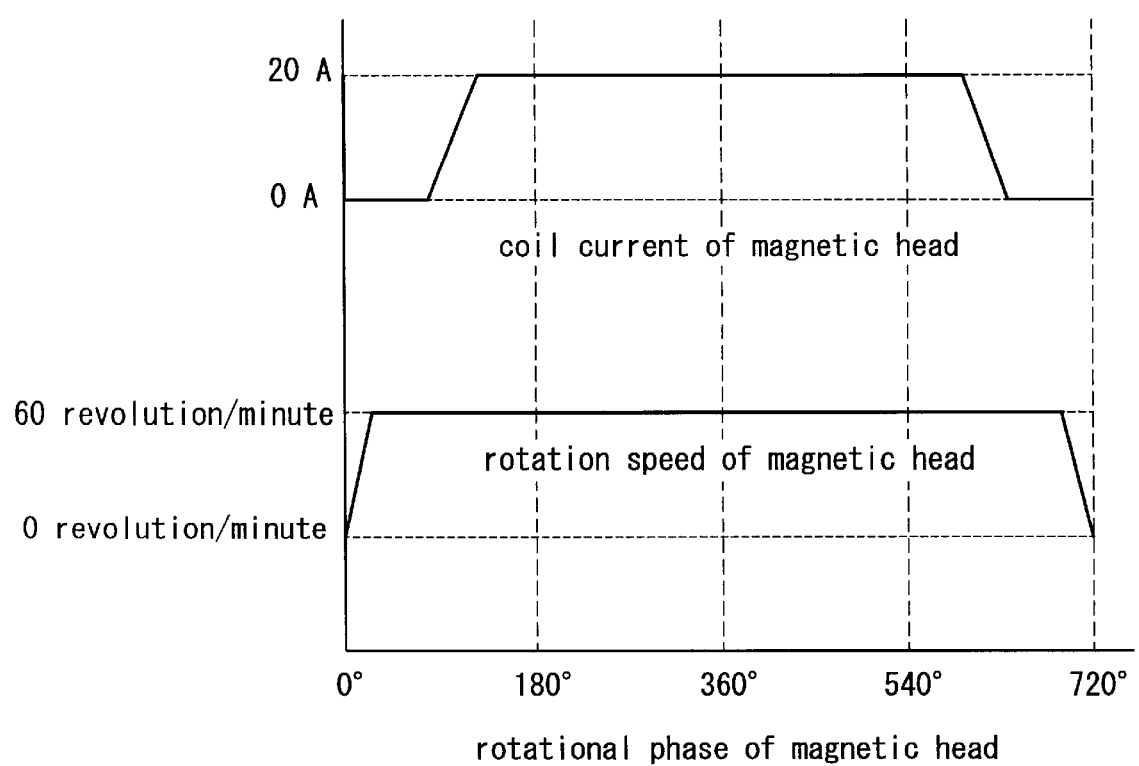
FIG. 31 is a graph showing the relationship of a rotational phase of a magnetic head to a rotation speed of the magnetic head and a current value applied to the coil of the magnetic heat at the time of transcription in the fourth embodiment.
Figure 32:
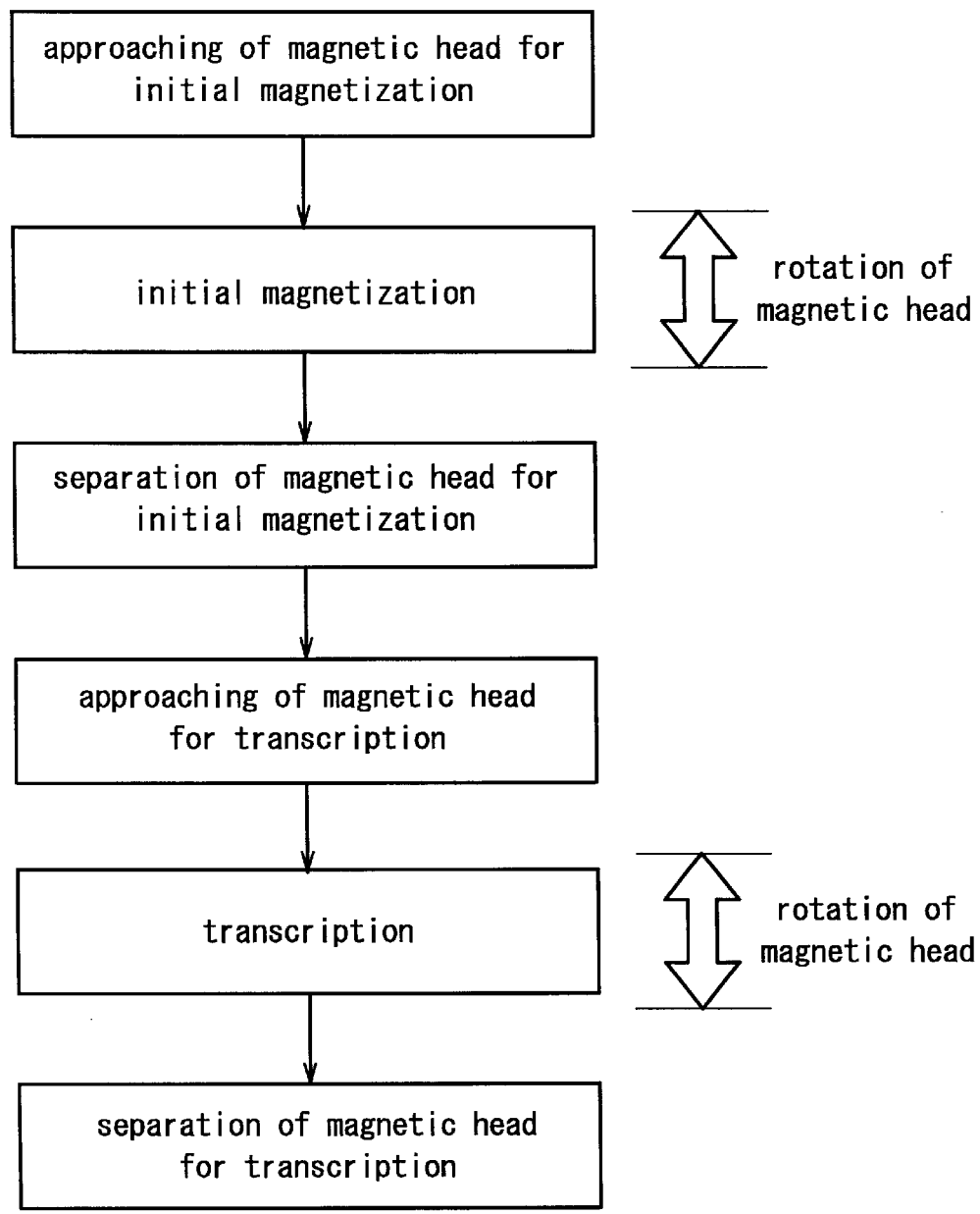
FIG. 32 is a flowchart showing the steps of transcription in a conventional example.
Figure 33:
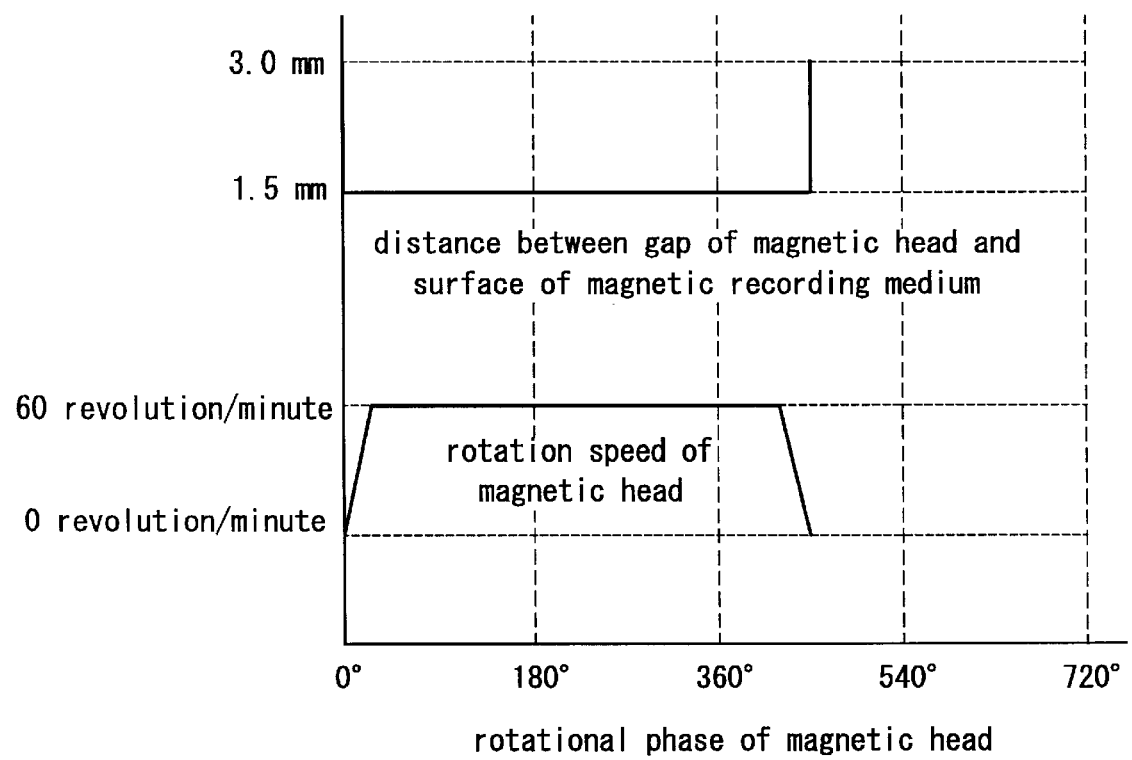
FIG. 33 is a graph showing the relationship of a distance between a magnetic head gap and a surface of a magnetic recording medium as well as a rotation speed of a magnetic head with respect to the rotational phase of the magnetic head at the time of transcription in the conventional example.
Figure 34:
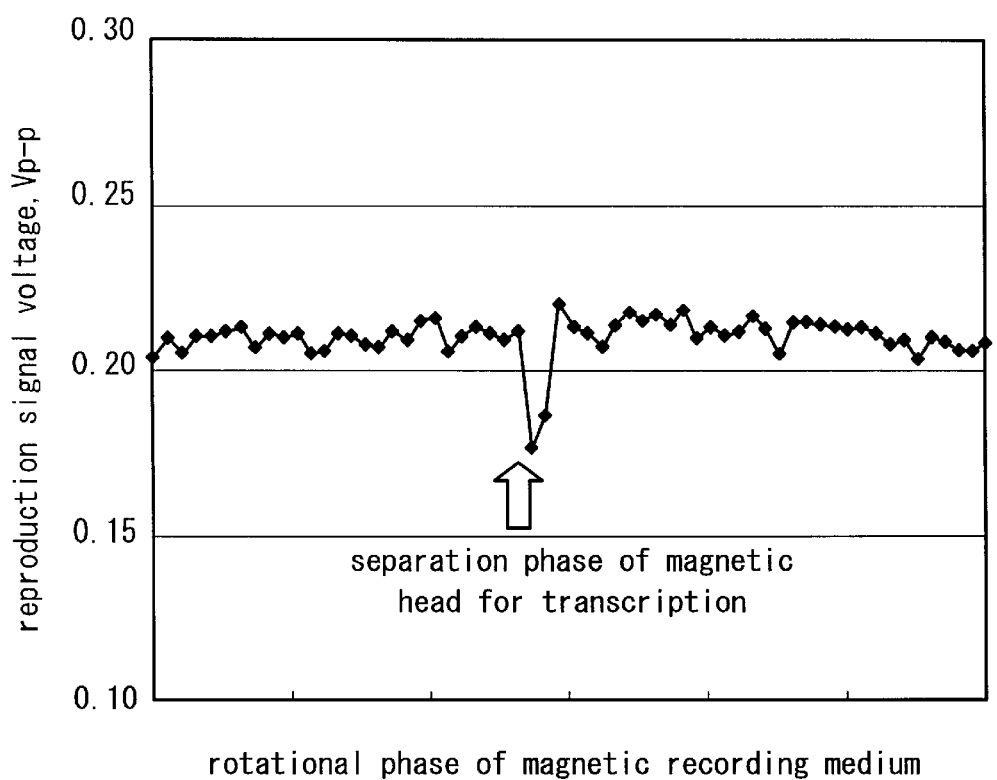
FIG. 34 is a graph showing the relationship between a rotational phase of a disc and a peak value of a reproduction signal in the conventional example.

Next, another embodiment of the present invention will be explained. As for the contents that are the same as those in the third embodiment, the explanation thereof is omitted. The object of the third embodiment was to solve the problem of signal deterioration in the cut-off position of the magnetic head 203 with the coil 203c. However, also at the time an electric current is applied to the coil, signal deterioration can be observed also in the position where current is applied due to conditions for transcription, that is, when a recording signal is not overwritten completely when the magnetic head 203 passes the position where current is applied again. Therefore, the electric current supplied to the coil 203c of the magnetic head 203 is reduced gradually in the third embodiment, so that signal deterioration can be prevented from occurring in the position where the electric current is cut off. However, the present embodiment follows the steps shown in FIG. 30 in that a transcription is performed simultaneously with the rotational operation for the time the electric current is applied as well as for the time the electric current is cut off. FIG. 31 shows the relationship of a rotational phase of the magnetic head 203 to a rotation speed of the magnetic head 203 and a value of electric current applied to the coil 203e of the magnetic head 203 at the time of transcription.

As shown in this drawing, when the current is applied, the coil current is increased gradually from 0A to 20A in the state in which the magnetic head is rotating at 60 revolutions per minute. When the current is cut off, the coil current is reduced gradually from 20A to 0A in the state in which the magnetic head is rotating at 60 revolutions per minute. In the present embodiment, the current value is applied and cut off while rotating the magnetic head 203, so that the position of the magnetic head 203 in the height direction will be fixed from the start to the end of the transcription.

By determining the steps as such, a signal recording can be performed with higher reliability in a wide range of transcription conditions. Also with respect to the initial magnetization, it is the same except that the position of the magnetic head relative to the magnetic disc is different.

As described above, the present invention can achieve uniform transcription recording over the entire surface of a magnetic recording medium without causing deterioration in the transcription recording signal due to the effect of magnetic flux in the vertical direction existing below the gap of the magnetic head used for generating an external magnetic field in the phase in which the magnetic head is separated.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A magnetic transcription device, for transcribing information signals to a magnetic recording medium having a ferromagnetic layer, the device comprising;

a support for a master information carrier that comprises a base and ferromagnetic bodies that correspond to information signals to be transcribed;

magnetic field generating means for applying a magnetic field to a master information carrier carried by the support, the magnetic field generating means being capable of relative rotation with respect to a master information carrier carried by the support; and driving means for adjusting a distance between the magnetic field generating means and a master information carrier carried by the support, the adjusting being carried out during relative rotation between the magnetic field generating means and a master information carrier carried by the support, the magnetic field generating means being sized so as to pass over substantially all the ferromagnetic bodies corresponding to information signals to be transcribed of a master information carrier carried by the support in a single rotation between the magnetic field generating means and a master information carrier carried by the support.

2. A magnetic transcription device according to claim 1, wherein the driving means is capable of carrying out the relative rotation between the magnetic field generating means and a master information carrier carried by the support.

3. A magnetic transcription device according to claim 1, wherein the driving means carries out adjusting by separating the magnetic field generating means from a master information carrier carried by the support after at least one rotation between the magnetic field generating means and a master information carrier carried by the support has been completed.

4. A magnetic transcription device according to claim 3, wherein the driving means further carries out adjusting by moving the magnetic field generating means and a master information carrier carried by the support close to each other during relative rotation between the magnetic field generating means and a master information carrier carried by the support.

5. A magnetic transcription device according to claim 1, wherein the magnetic field generating means comprises a magnetic core and a coil for generating a magnetic filed through a current supplied to the coil by current application means, the current application means being capable of gradually reducing a current value to be supplied to the coil after at least one rotation between the magnetic field generating means and a master information carrier carried by the support has been completed, the reduction of a current value being carried out during the rotation.

6. A magnetic transcription device according to claim 5, wherein the current application means gradually increases the current supplied to the coil during relative rotation between the magnetic field generating means and a master information carrier carried by the support.

7. The magnetic transcription device according to claim 1, wherein the magnetic field generating means comprises a magnetic core made of a ferromagnetic material and a permanent magnet.

8. The magnetic transcription device according to claim 1, wherein the magnetic field generating means comprises a magnetic core made of a ferromagnetic material and a coil.

9. A method for transcribing information signals of a master information carrier to a magnetic recording medium having a ferromagnetic layer, the master information carrier comprising a base and ferromagnetic bodies corresponding to the information signals to be transcribed, the method comprising:

moving a magnetic field generating means close to a surface of a contact body comprising the master information carrier and the magnetic recording medium;

applying a magnetic field from the magnetic field generating means to the contact body, with relative rotation being carried out between the contact body and the magnetic field generating means; and separating the magnetic field generating means from the contact body while continuing relative rotation between the contact body and the magnetic field generating means to complete the transcription.

10. The method according to claim 9, further comprising moving the magnetic field generating means and the contact body close to each other during relative rotation between the contact body and the magnetic field generating means.

11. The method according to claim 9, wherein the magnetic field generating means comprises a magnetic core and coil for generating a magnetic field through a current supplied to the coil, and a current value supplied to the coil gradually is reduced while continuing the relative rotation when the transcription is completed.

12. The method according to claim 11, wherein the current value supplied to the coil gradually is increased to reach a level for generating a magnetic field for transcription.

* * * * *